(12) United States Patent
Yajima et al.

(10) Patent No.: US 6,872,442 B2
(45) Date of Patent: Mar. 29, 2005

(54) METHOD FOR RECYCLING SYNTHETIC WOOD MATERIALS FROM SHEATHING BOARD FOR USE IN A CONCRETE FORM FORMED BY SYNTHETIC WOOD MATERIALS, AND SHEATHING BOARD FOR USE IN A CONCRETE FORM HAVING THE PREVIOUSLY MENTIONED RECYCLED SYNTHETIC WOOD MATERIALS AS RAW MATERIALS

(75) Inventors: Masami Yajima, Gifu (JP); Hitoshi Takahashi, Nagoya (JP); Sadao Nishibori, Tokyo (JP); Takeyasu Kikuchi, Tokyo (JP)

(73) Assignees: EIN Co., Ltd. Technical Center, Gigu (JP); Director General, Chubu Regional Bureau, Ministry of Land, Infrastructure and Transport, Aichi (JP)

( * ) Notice: Subject to any disclaimer, the term of this patent is extended or adjusted under 35 U.S.C. 154(b) by 295 days.

(21) Appl. No.: 09/906,855

(22) Filed: Jul. 18, 2001

(65) Prior Publication Data

US 2002/0117565 A1 Aug. 29, 2002

(30) Foreign Application Priority Data

Dec. 22, 2000 (JP) ......................... 2000-391020

(51) Int. Cl.[7] ............................. B32B 3/28; B32B 21/04
(52) U.S. Cl. ....................... 428/188; 428/107; 428/113; 428/537.1; 428/903.3
(58) Field of Search ................................. 428/106, 107, 428/113, 178, 188, 166, 526, 527, 528, 535, 536, 537.1, 903.3

(56) References Cited

U.S. PATENT DOCUMENTS 3,441,959 A * 4/1969 Sears et al. .............. 428/304.4
4,228,116 A * 10/1980 Colombo et al. ........... 264/119
6,015,612 A * 1/2000 Deaner et al. .............. 428/326
6,180,257 B1 * 1/2001 Brandt et al. ............... 428/532

OTHER PUBLICATIONS

Patent Abstracts of Japan, vol. 1995, No. 10, Nov. 30, 1995, JP 07171831 (Ube Ind Ltd), Jul. 11, 1995.
Patent Abstracts of Japan, vol. 2000, No. 04, Aug. 31, 2000, JP 20000274431 (Konishi Masao), Jan. 25, 2000.
Patent Abstracts of Japan, vol. 1998, No. 01, Jan. 30, 1998, JP 09234710 (Marui Sangyo KK), Sep. 9, 1997.

* cited by examiner

Primary Examiner—Donald J. Loney
(74) Attorney, Agent, or Firm—Shlesinger, Arkwright & Garvey LLP

(57) ABSTRACT

There is provided a method for recycling synthetic wood materials, transformed into materials through a relatively simple method without performing elimination of encrusted concrete from a previously used sheathing board for use in a concrete form having synthetic wood materials as raw materials. The method consists of a step wherein a sheathing board 1 (1a) which had been previously used as a concrete form 50 and formed from synthetic wood materials with a moisture content of less than 15 wt %, wherein between 20 and 75 wt % of cellulose crushed materials, such as wood meal with particle diameters of between 50 and 200 μm, and between 25 and 80 wt % of thermoplastic resin molding materials, are mixed, is crushed into numerous coated particles 82, and a step wherein a scraping impact force is applied to each individual coated particle 82, concrete and other encrusted materials encrusted on the previously mentioned coated particles 82 are peeled or separated, and at the same time as the synthetic wood materials constituting the coated particles 82 and the encrusted materials are classified, the particles of the synthetic wood materials are granulated, and the granulated synthetic wood meal materials 83 for which the particles have been granulated are recycled.

1 Claim, 21 Drawing Sheets

METHOD FOR RECYCLING SYNTHETIC WOOD MATERIALS FROM SHEATHING BOARD FOR USE IN A CONCRETE FORM FORMED BY SYNTHETIC WOOD MATERIALS, AND SHEATHING BOARD FOR USE IN A CONCRETE FORM HAVING THE PREVIOUSLY MENTIONED RECYCLED SYNTHETIC WOOD MATERIALS AS RAW MATERIALS

BACKGROUND OF THE INVENTION

1. Field of the Invention

The present invention relates to a method for recycling synthetic wood materials from sheathing board for use in a concrete form made of synthetic wood materials, and a sheathing board for use in concrete form having these recycled synthetic wood materials as raw materials, and a technique for recycling sheathing board which is as lightweight as sheathing boards made of plywood, having an adequate workability and being convenient to handle, having a sufficient strength for use as a concrete form and which can be regenerated by retransforming into materials after use.

2. Description of the Related Art

As a general concrete form currently in use, there is the form made of plywood which uses plywood as the sheathing board. In this form made of plywood, although labor is expended to improve the finishing of the concrete surface, such as coating the surface of sheathing board with oil or synthetic resin, a sheathing board made of plywood has a relatively light weight and has considerable workability when transporting and installing, while at the same time, it has a considerable workability such as cutting, and, having an adequate heat retaining property towards concrete, it exhibits an excellent efficacy for casting concrete in the winter.

Such plywood which forms the sheathing board of the plywood form has natural wood as raw materials. However, according to the 1987 "Forest Products Statistics" by FAO, the gross wood export volume from the tropical rain forest region was approximately 7,700 ml, of which Japan imported 27% as 2,200 m³ of South Sea wood, and 76% of this imported South Sea wood was consumed as plywood. Such environmental destruction has been the cause of problems, such as global warming, due to the deforestation of the rain forest region which is consumed in large quantities in this way. Therefore, the amount of consumption of natural wood being used for plywood should be decreased.

As a result of such a requirement, plywood forms are repeatedly used several times, in an attempt to realize effective use. However, to reuse a previously used plywood form, a so-called "Surface cleaning operation" needs to be performed, which consists of removing the concrete encrusted on the surface of the form with a brush or a spatula. This activity is complex.

In addition, forms which have been, for example, cut and worked to match the working place, the fragments of these forms, furthermore, among the forms which have been repeatedly used as described previously, those which have exhausted their lives as forms due to chipping and deformation, can not be regenerated and reused in the same way as, for example, resin materials are, and are ultimately disposed of. Therefore, from the standpoint of the conservation of the natural environment, the appearance of a sheathing board for use in concrete forms is in demand, obviously usable over several times, and made of materials which are recyclable by, for example, transforming into materials after their lives as concrete forms have been exhausted.

As such sheathing boards made of materials other than plywood, metal forms and forms made of resin exist.

In the above description, the metal form is considerably more rigid when compared to the plywood form, with only slight chipping and deformation, and can sustain repeated use. However, this metal form is heavier in comparison to the form made of plywood, and does not allow for operation with human power in cases such as transport, installation and uninstallation. In addition, workability such as cutting is not adequate and its handling is difficult.

In addition, the metal form is easily influenced by external temperatures, has an inadequate heat retaining property towards concrete, and is not as suited as the plywood form to operation in the winter. Also, the concrete surface may become stained by corrosion.

In addition, as with the previously described plywood form, in order to improve the mold releasing property, it needs to be coated with oil or synthetic resin mold release agent. Also, to reuse a metal form once it has been used as a form, a Surface cleaning operation is necessary to remove the concrete encrusted on its surface with a brush or a spatula.

Thus, when compared to the previously described form made of plywood, the metal form is inconvenient to handle, and does not have the quality of a concrete form replacing the form made of plywood.

A form made of resin has been proposed as a concrete form which solves the shortcomings of the metal form such as the ones described above, and replaces the form made of plywood (for example, Kokai No. Hei. 6-88421, Kokai No. Hei. 8-23038).

This form made of resin has fiber reinforced plastic as raw materials, wherein plastic such as polypropylene is reinforced with glass fibers, and strength is added to sustain the pressure produced when casting concrete, by placing on one side of the sheathing board, several ribs with a height of approximately. 60 mm, parallel to the direction of the length of the sheathing board.

This form made of resin is lightweight, has considerable workability such as cutting, and allows for easy handling, when compared to the previously described metal form.

However, cutting this form made of resin, reinforced with, for example, glass fibers, requires that a chainsaw for plastic be used, and at the same time, in the case of such a processing operation, the scattered glass fibers may adhere to the clothes and the skin, accompanied by severe pain and itching.

In addition, the opening formed on the sheathing board for mounting the separator must be formed monolithically when casting the sheathing board made of resin. Therefore, with this kind of sheathing board, the degree of freedom for working in the field is low.

In addition, concerning the previously mentioned sheathing board made of resin, since, as previously described, it comprises ribs having a relatively thick thickness of greater than 60 mm to maintain its strength, it is a voluminous item for transportation and storage.

Further, once the sheathing board has been used as a concrete form, its surface is encrusted with large quantities of exogenous materials such as concrete and gravel. To transform the broad into materials and regenerate a board, it is necessary to perform the elimination of exogenous materials, by eliminating the encrusted materials such as concrete and gravel with a brush and a spatula, and by further washing the surface of the form after elimination. A large amount of labor and expense is expended for this operation, and constitute the weak points of the recycling and regeneration of the sheathing board.

In addition, as previously described, when washing sheathing board, the waste water generated during the washing must be treated appropriately, which requires an installation and labor.

Consequently, the object of the present invention, is to solve the above mentioned shortcomings of the prior art, a further object of the present invention is to achieve an effective utilization of resources as well as an improvement of the natural environment by providing a method for obtaining raw materials from a transformation into materials, through a relatively simple method, without eliminating, using a brush and a spatula, encrusted materials such as concrete, which are encrusted on the surface of a sheathing board, used in a concrete casting operation, and without washing, and by providing at the same time, a method for regenerating a sheathing board again from these obtained raw materials, promote the reuse of sheathing boards, and decrease the amount of usage of sheathing boards made of plywood having natural wood as raw materials.

In addition, another object of the present invention is to achieve an effective utilization of resources as well as an improvement of the natural environment by providing a sheathing board which is as lightweight as a sheathing board made of plywood, has adequate workability and is convenient to handle, at the same time having sufficient strength to be used as a concrete form, which can further be regenerated after use, by transforming again into materials, and decreasing the amount of usage of sheathing boards made of plywood having natural wood as raw materials.

SUMMARY OF THE INVENTION

In order to achieve the above mentioned object, the method for recycling synthetic wood materials of the present invention consists of a step wherein a sheathing board 1 (1*a*), formed from synthetic wood materials with a moisture content of less than 15 wt %, wherein between 20 and 75 wt % of cellulose crushed materials, such as wood meal with particle diameters of between 50 and 200 $\mu$m, and between 25 and 80 wt % of thermoplastic resin molding materials, are mixed, is used as a concrete form 50, taking as the processing object this sheathing board 1 (1*a*) used as the concrete form 50, and crushing this sheathing board 1 (1*a*) into numerous coated particles 82, and a step wherein a scraping impact force is applied to each previously mentioned crushed individual coated particle 82, concrete and other encrusted materials encrusted on the previously mentioned coated particles 82 are peeled or separated, and at the same time as the synthetic wood materials constituting the coated particles 82 and the encrusted materials are classified, the particles of the synthetic wood materials are granulated, and these granulated synthetic wood meal materials 83 for which the particles have been granulated are recycled.

In addition, the sheathing board 1 for use in the concrete form 50 of the present invention is formed, as previously described, with synthetic wood materials as raw materials, recycled from the sheathing board 1 (1*a*) formed from synthetic wood materials previously used as the concrete form 50, wherein the synthetic wood materials have a moisture content of less than 15 wt % and is a mixture of between 20 and 75 wt % of cellulose crushed materials, such as wood meal with particle diameters of between 50 and 200 A m, and between 25 and 80 wt % of thermoplastic resin molding materials, and with a hollowness of between 20 and 70% created by forming, within the thickness of the board and with a defined interval, several hollow spaces extending in a specific direction, and at the same time, with a thickness of the walls delimiting the previously mentioned hollow spaces, of greater than 2 mm.

Further, in the method for recycling the previously described synthetic wood materials, a further step may be established, wherein the previously mentioned recycled granulated synthetic wood meal materials 83 are sifted, to eliminate dust such as encrusted materials mixed within the granulated synthetic wood meal materials 83.

In addition, preferably, a step may be established to dry the previously mentioned recycled granulated synthetic wood meal materials 83 to a moisture content of less than 0.1 wt %.

In addition, the sheathing board for use in a concrete form, having the previously mentioned recycled synthetic wood materials as the raw materials, may be formed as an immaculate sheathing board, with the synthetic wood materials recycled from the sheathing board, formed from a previously used synthetic wood materials, as the raw materials, wherein the synthetic wood materials have a moisture content of within 15 wt % and is a mixture of between 20 and 75 wt % of cellulose crushed materials, such as wood meal with particle diameters of between 50 and 200 $\mu$m, and between 25 and 80 wt % of thermoplastic resin molding materials.

BRIEF DESCRIPTION OF THE DRAWINGS

The objects and advantages of the invention will become apparent from the following detailed description of preferred embodiments thereof provided in connection with the accompanying drawings throughout which like numerals denote like elements and in which.

DETAILED DESCRIPTION OF THE PREFERRED EMBODIMENT

Figure 1:
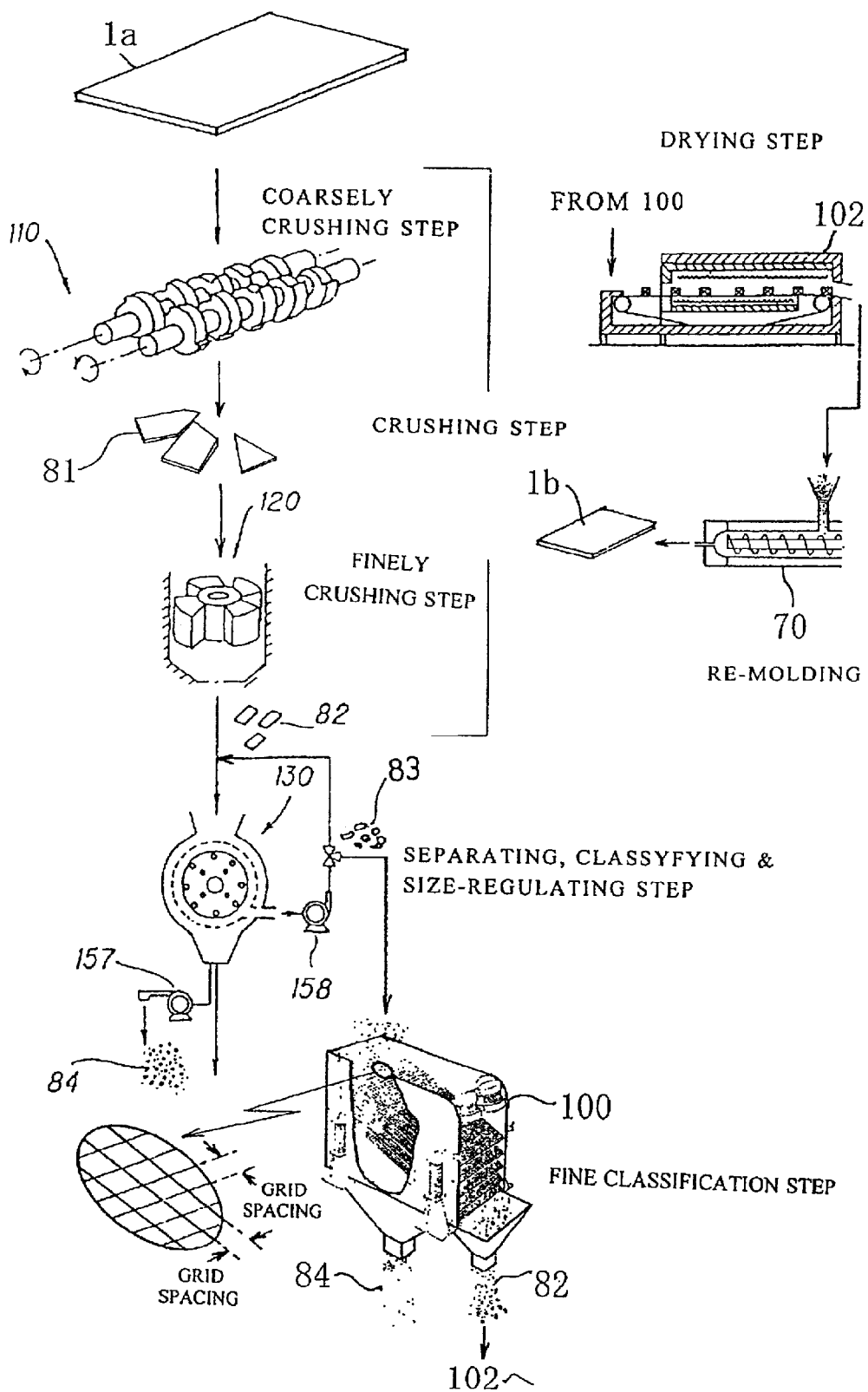
FIG. 1 is an outline illustration schematically showing the step from the recycling of the synthetic wood materials from the previously used sheathing board, to the reproduction of the sheathing board from said recycled synthetic wood materials.

In the following, the embodiment of the present invention will be explained with reference to the attached figures.

(Method for Recycling Synthetic Wood Materials)

The method for recycling synthetic wood materials of the present invention, is a method wherein a discarded sheathing board 1 (1a), made of synthetic wood materials and used as one part of a concrete form 50, is turned into raw materials, and the latter is retransformed into materials to obtain synthetic wood materials. Synthetic wood materials recycled through the method of the present invention, can be regenerated into, for example, a sheathing board (regenerated product) 1 (1b) for use in a concrete form of the present invention, described below.

Explanation on the method for recycling synthetic wood materials of the present invention is as follows: this method consists of a step wherein a discarded and recycled sheathing board 1a, made of synthetic wood materials, is crushed into coated particles 82 having one side of between 3 and 35 mm (crushing step), a step wherein scraping impact force is applied to the previously mentioned coated particles 82 obtained through the crushing step, concrete and other encrusted materials encrusted on the previously mentioned coated particles 82 are peeled or separated, and at the same time as these resin materials and these encrusted materials are classified, synthetic wood materials at the surface of the sheathing board 1a, deteriorated through its repeated use, as well as other coated particles 82 are, for example, slightly trimmed by the application of the scraping impact force, to obtain granulated synthetic wood meal materials 83, which are coated particles 82 which have been granulated (step of separation, classification and size regulation), a step wherein the previously mentioned particular synthetic wood materials 83 obtained through the step of separation, classification and size regulation, are sifted, and encrusted materials such as dust 84, mixed within the granulated synthetic wood meal materials 83, are eliminated (fine classification step), a step wherein the previously mentioned granulated synthetic wood meal material 83 from which dust 84 has been eliminated through the fine classification step, are dried (drying step), and a step wherein the previously mentioned dried granulated synthetic wood meal materials 83 are molded into a sheathing board, having a hollow structure, through molding with an extruder (molding step) (ref FIG. 1).

(Raw Materials)

The sheathing board 1a which forms the recycling source for the synthetic wood materials, has synthetic wood materials as raw materials, formed by mixing wood meal such as cellulose crushed materials, and thermoplastic resin molding materials. As one example, a sheathing board 1a, wherein either or both of the previously mentioned cellulose crushed materials and thermoplastic resin molding materials which constitute the sheathing board 1a, may have as raw materials various waste materials disposed of as construction waste, interior and exterior equipment for automobiles and vehicles, electric home appliances and packaging containers, a sheathing board 1a having as the cellulose crushed materials construction wastes or wood from roadside trees, which have been pruned, disposed of and crushed, and a sheathing board 1a formed from general thermoplastic resins such as PP, PE, PVC, PET, ABS and PS, as the thermoplastic resin molding materials, may be considered.

Furthermore, the sheathing board 1a, which forms the recycling source for the synthetic wood materials, may be a sheathing board regenerated with recycled synthetic wood materials as the raw materials, through a method of the invention described below.

Explanation on the example of production of the sheathing board 1a, which forms the recycling source for the synthetic wood materials, is as follows: the thermoplastic resin molding materials which form the raw materials for this sheathing board 1a, are general thermoplastic resins such as PP, PE, PVC, PET, ABS and PS, transformed into materials which are thermoplastic resin molding materials, either directly, in cases of previously described various articles made of molded resin which have been disposed of, or by crushing the articles made of molded resin, having a formed surface resin coating film, into numerous individual particles, applying compression grinding step to each of the previously mentioned individual crushed particles to grind and peel the resin coating film, applying compression impact force, which is based on microvibrations, to each of the previously mentioned individual ground particles to collapse and crush them, and eliminating, at any time, the resin coating film peeled by collapsing and crushing.

In addition, in the extrusion molding, the recycled thermoplastic resin molding materials obtained from the waste of articles made of thermoplastic synthetic resin, may be reused to charge the previously mentioned extruder, or a virgin thermoplastic resin may be used for charging, or a virgin thermoplastic resin and the previously mentioned recycled thermoplastic resin molding materials may each be used for charging, for instance at 50% each.

The cellulose crushed materials which are the other raw materials, are crushed to have diameters of particles of between 50 and 200 μm (less than 100 mesh), preferably, and after drying to a moisture content of less than 15 wt % they are kneaded with thermoplastic resin molding materials and extruded by the extruder to be molded into a sheathing board. In the event that the thermoplastic resin molding materials to be kneaded are PP or PE, the previously mentioned cellulose crushed materials are included with a proportion relative to the total amount of kneaded raw materials of 75 wt % maximum, preferably of between 30 and 70 wt %.

In addition, in the event that the thermoplastic resin molding material is PVC, wood meal which is cellulose crushed materials is mixed in with a proportion of between 30 to 60 wt %, preferably of 45 wt %, and in the event that the thermoplastic resin molding material is PET, it is mixed in with a proportion of wood meal of 60 wt % maximum, preferably of between 20 and 60 wt %.

The wood meal, which is cellulose crushed materials, composed as previously described, and the thermoplastic resin molding materials, are extruded into a molding die, and are molded as to have a thickness of between 12 and 50 mm, preferably of between 12 and 15 mm, more preferably of between 16 and 20 mm, a width of between 300 and 900 mm, preferably of between 600 and 900, more preferably of 600 mm, and a length of between 1500 and 2000 mm, preferably of between 1500 and 1800 mm, and more preferably of 1800 mm.

In the event that formation was as an immaculate sheathing board, setting the above mentioned thickness to between 5 and 20 mm, preferably between 8 and 15 mm, more preferably between 12 and 14 mm, is suitable from the perspective of yield and weight.

In addition, to further improve the properties of the previously mentioned wood meal, materials such as wood chips may be immersed in urea resin adhesive, or, after being added to it, may be thermoset, crushed and ground granulated to sizes of between 50 and 200 μm (less than 100 mesh). Concerning the method for forming such wood meal, sufficient thermosetting, particularly through thermosetting while neutralizing with urea resin adhesive, allows the wood acid in the wood meal, to be rapidly eliminated by neutralization and evaporation, and at the same time, a hardened adhesive face is established on the wood meal phase, which effectively prevents the increase of moisture within the wood meal, and further increases the slidability of the wood meal, and decreases the resistance due to friction during extrusion molding.

In addition, a texture is formed, with an even better intimacy between the wood meal and the thermoplastic resin molding materials, having a kneaded state which is adequate to decrease the frictional resistance of wood meal, by charging into a hopper 3 of an extruder 70 described below, a synthetic wood powder obtained by mixing together, with stirring impact applying blades, between 20 and 75 wt % of cellulose crushed materials wherein the moisture content is of within 15 wt % and the average diameter of particles is of less than 20 mesh, and between 25 and 80 wt % of thermoplastic resin molding materials, kneading the mixture to form gel by friction, air cooling at normal temperature, or cooling by an appropriate means, the previously mentioned kneaded materials set to gel, and by further size regulating the diameter of particles to less than 10 mm.

(Crushing Step)

The present step is a step wherein the previously described sheathing board 1a, which is to become raw materials, is crushed into particles having one side of between 3 and 35 mm, then these particles obtained by crushing are recycled as coated particles 82. This crushing step may form the coated particles 82 by crushing the sheathing board 1a, which is the processing object of the step, into a defined size in one step. However, in the present embodiment, crushing is performed through a two stage step of a coarsely crushing step wherein the sheathing board, which is the processing object of the step, is crushed coarsely, and a fine crushing step wherein the sheathing board particles 81, formed by crushing coarsely, are further finely crushed to form coated particles 82.

In the present embodiment, through the previously mentioned coarsely crushing step, the processing object may be crushed in to particles 81 of undefined form having sides of approximately 20×50 mm, such as, for example, a mixture of squares, rectangles and the like, trapezoids, triangles or other polygons, and the particles 81 obtained through this step are further crushed into particles having a side of between 3 and 35 mm, preferably of between 5 and 20 mm, through a fine crushing step to obtain the coated particles 82.

In this way, with the present embodiment, by performing a crushing step through 2 or more steps, even for a relatively large 1800 mm long, 600 mm wide and 18 mm thick sheathing board, its crushing can be performed efficiently.

In addition, this crushing step may also be performed using any apparatus capable of crushing the sheathing board, which is the processing object, into the previously described size. In addition, the crushing step may be performed through a crushing means formed by combining crushers of the same type or of different types. As one example, the present embodiment performs this crushing through a coarsely crushing step performed by a two shaft crusher (crusher 110: ref FIG. 1), which is a coarsely crushing means, and a fine crushing step performed by a one shaft crusher (cutter mill 120), shown in FIG. 2, which is a fine crushing means. Therefore, in the present embodiment, the crushing step includes the two steps of coarsely crushing step and fine crushing step. In addition, the crushing means is configured by combining the previously mentioned two shaft crusher and one shaft crusher.

(1) Two Shaft Crusher

As the two shaft crusher used in the previously mentioned coarsely crushing step, for example, the gainax crusher made by Horai Co., Ltd., the roll crusher made by Nara Machinery Co., Ltd., and various known monocutters, shredders, crushers and the likes (in the following, these will be collectively called "crushers") may be used.

This crusher 110, shown in FIG. 1 as one example, is equipped with two parallel shafts which mutually rotate at the same time towards the inside of the crusher body, with several rotating knives placed at a specific interval on each shaft, and it is equipped to cut coated granules into crushed pieces which consist of fragments of suitable size, with 3 nails protruding from the peripheral face of each rotating knife so as to form isometric angles, with each shaft being engaged with the other at the periphery of each rotating knife.

The coated granules are charged from the charging port of the upper portion of the crusher, pulled inside by the nails of the rotating knives from the two shafts which rotate mutually inwards, while being slit by the shearing force applied continuously between the edges at the periphery of the rotating knives which rotate in an engaged state, and are then crushed and cut by the pressure applied when pulling in, to form crushed pieces. In the present embodiment, the sizes of the previously mentioned nails and edges are selected in such a way that the sheathing board, which is the processing object, is crushed coarsely into approximately 20×50 mm portions, the crushed pieces formed by crushing the processing object into the previously mentioned size, pass through the screen installed under the previously mentioned rotating knives from the two shafts, and are discharged from discharge port. In addition, chips 81 formed in this way are crushed coarsely into the chips 81 of undefined shape such as polygon forms such as rectangles and squares, triangles, trapezoids and rhomboids, and are discharged from the previously mentioned discharge port.

(2) One Shaft Crusher

The chips 81 crushed coarsely as above are crushed into chips having, as one example, a size wherein a side is between 3 and 35 mm, through a known crushing means which is, for example in the present embodiment, the one shaft crusher (for convenience, called "cutter mill" in the present description), and this constitutes the coated particles 82.

Figure 2:
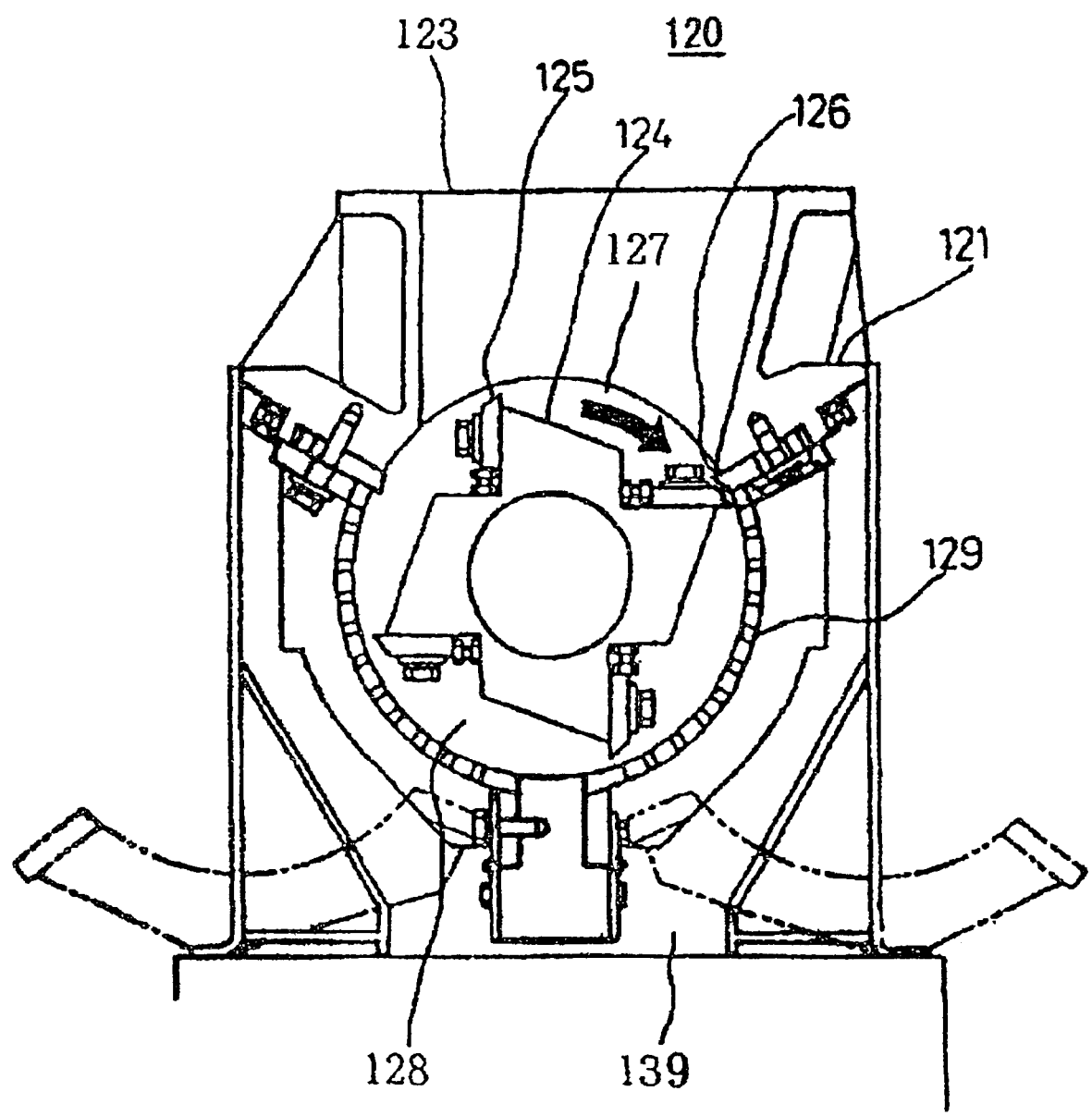
FIG. 2 is a partly sectional view showing an example of fine crushing means (cutter mill) used in the embodiment of the present invention.

A cutter mill, which is one example of crushing means, is shown in FIG. 2. Numeral 121 is a cutter mill main body, which is a casing forming a cylindrical shape having a charging port 123 on the upper side. Inside the previously mentioned cutter mill main body 121, a cutter supporter 124 is installed, which rotates in the vertical direction via a rotation driving means not shown, and whose axis is bone in the cutter mill main body 121. At the periphery of this cutter supporter 124, 4 (four) long rotating knives 125 are installed in the horizontal direction so as to form isometric angles of 90 degrees around the direction of rotation of the cutter supporter 124. The tips of the blades of these 4 rotating knives 125 are positioned on the same rotation locus.

In addition, through a slight interval with respect to the locus of the tips of the blades of the previously mentioned 4 rotating knives 125, 2 (two) fixed knives 126 are fixed to the cutter mill main body 121, at a position approximately symmetric to the locus of the tips of the blades of the rotating knives 125, the interior of the cutter mill main body 121 is divided by the 2 fixed knives 126, the cutter supporter 124 and the rotating knives 125, to form a charging chamber 127 and a crushing chamber 128. The previously mentioned charging port 123 communicates with the previously mentioned charging chamber 127. In addition, the clearance between the 2 fixed knives 126 and the rotating knives 125 can be freely adjusted to cut the coated granules to a desired size, or generally to crush.

In addition, the crushing chamber 128 is delimited by a mesh screen 129 in such a way such as to surround the periphery of the rotation locus of the rotating knives 125 of the 2 fixed knives 126 previously mentioned. In addition, in the present embodiment, the screen 129 uses punched metal in which numerous holes with diameters of between 5 and 20 are formed. In addition, below the crushing chamber 128, a discharge port 139 is installed for discharging crushed pieces and encrusted materials, such as concrete, which were peeled from the surface of the chips 81 during crushing, that passed through the screen 129.

In the above cutter mill 120, the chips 81, which were formed by crushing coarsely with the previously mentioned crusher 110, are charged from the charging port 123, and then, by rotating the cutter supporter 124 at, as one example, 800 min$^{-1}$ by a rotation driving means (power of 5.5 KW) not shown, the chips 81, which were formed by crushing coarsely, are crushed coarsely between the rotating knives 125 of the cutter supporter 124 and the fixed knives 126, into chips of undefined shape such as, polygons such as rectangles and squares, or triangles, trapezoids, or rhomboids, with unspecified form and surface. By using punched metal having a diameter of between 5 and 20 mm as the screen 129, at the same time, by suitably adjusting the operation time, the charged chips 81 become the coated particles 82 with a size having a length or a diameter of between 3 and 35 mm. These coated particles 82 do not pass through the screen 129, and remain inside the crushing chamber 128.

On the other hand, a portion of the encrusted material such as concrete which is peeled from the surface of the chips 81 during the previously mentioned crushing, and the chips which are crushed to a size which enables them to pass through the opening of the previously mentioned screen 129, pass through the screen 129 and are discharged through the discharge port 139.

In this way, the chips which remain inside the crushing chamber 128 without passing through the screen, become the coated particles 82.

In addition, the reason for setting the size of the coated particles 82, which are to be brought to the next step, as previously described to between 3 and 35 mm, lies in the fact that, on one hand, if one side of the coated particles 82 is less than 3 mm, they are finely crushed during the step of separation, classification and size regulation described below, which decreases the amount of synthetic wood materials which is recycled as regeneratable materials, while on the other hand, if it is set to greater than 35 mm, the processing capacity of the step of separation, classification and size regulation is decreased.

In addition, in the embodiment shown in FIG. 2, the cutter mill 120 is represented as being equipped with a rotation shaft oriented in the horizontal direction. However, the cutter mill 120 used in the present invention may be a cutter mill having a rotation shaft oriented in the vertical direction, and any other types of cutter mill may be used. In addition, any apparatus, other than the cutter mill 120, may be used, as long as it is capable of processing the chips 81 into coated particles with defined size.

(Steps of Separation, Classification and Size Regulation)

Scraping impact force is applied to the coated particles 82, formed in the crushing step as indicated above by crushing the sheathing board 1a, which was used as a concrete form 50, into undefined forms having one side of between approximately 3 and 35 mm, concrete still encrusted to the surface of the coated particles 82, and other encrusted materials are peeled or eliminated, and at the same time, synthetic wood materials are recovered, such as the synthetic wood materials deteriorated by repeated usage such as the region corresponding to the surface of the sheathing board 1a, by applying the previously mentioned scraping impact force, to slightly trim the coated particles 82 themselves so as to regulate and transform them into raw materials.

Figure 3:
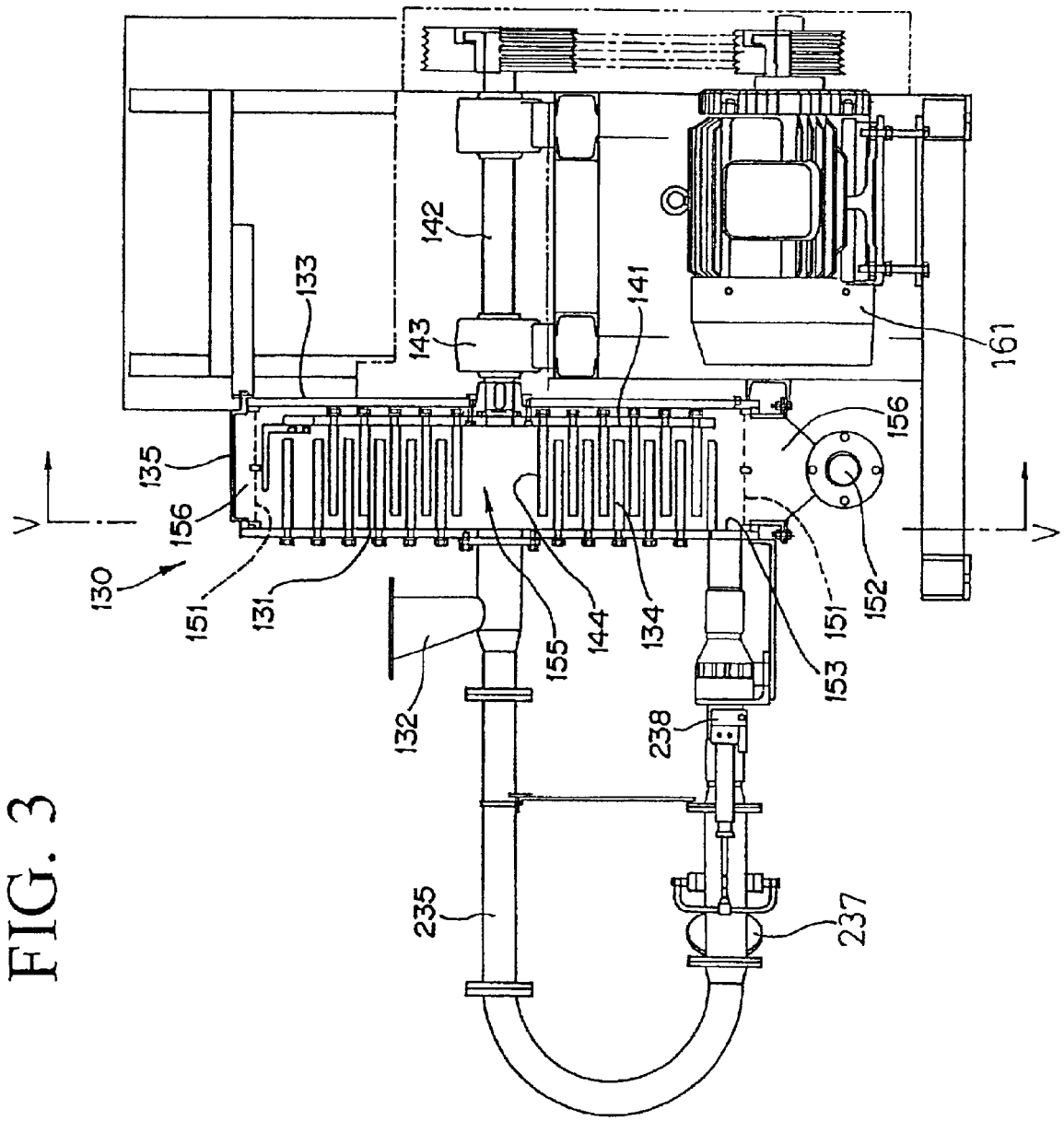
FIG. 3 is an overall perspective view showing main parts of the means for separating, classifying and size regulating of particles (cleaning separator) used in the embodiment of the present invention.
Figure 4:
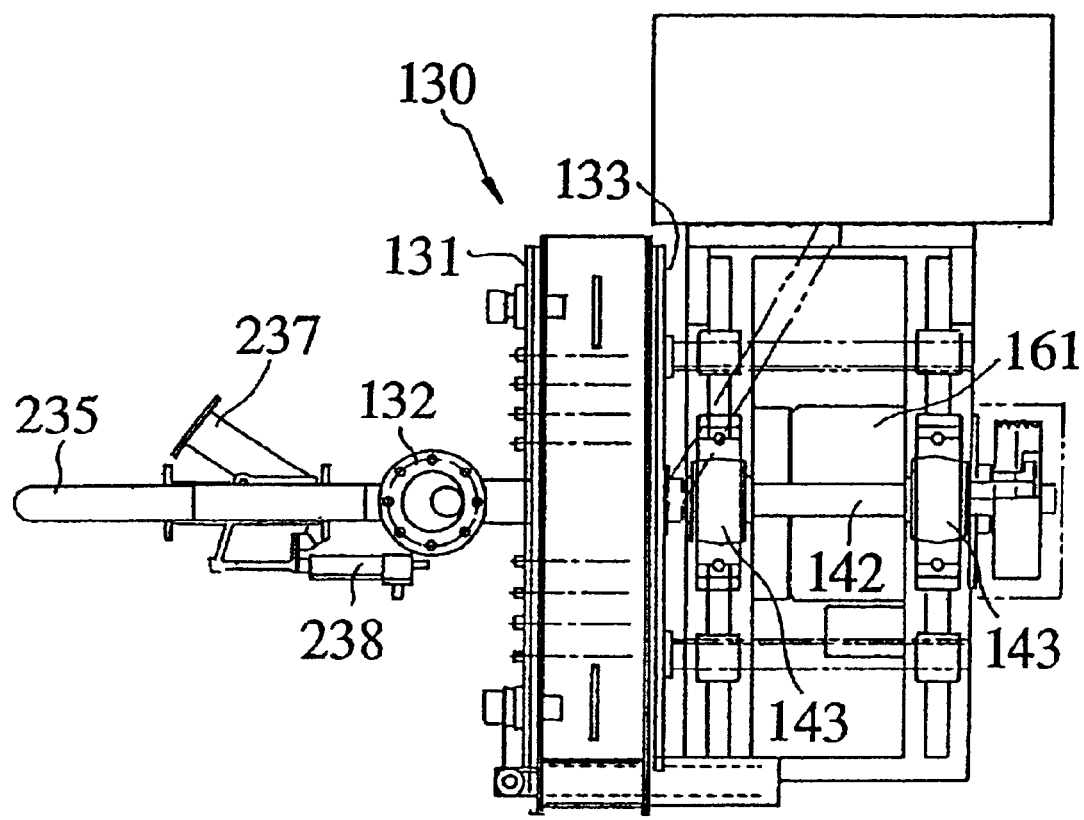
FIG. 4 is a plan view of FIG. 3.
Figure 5:
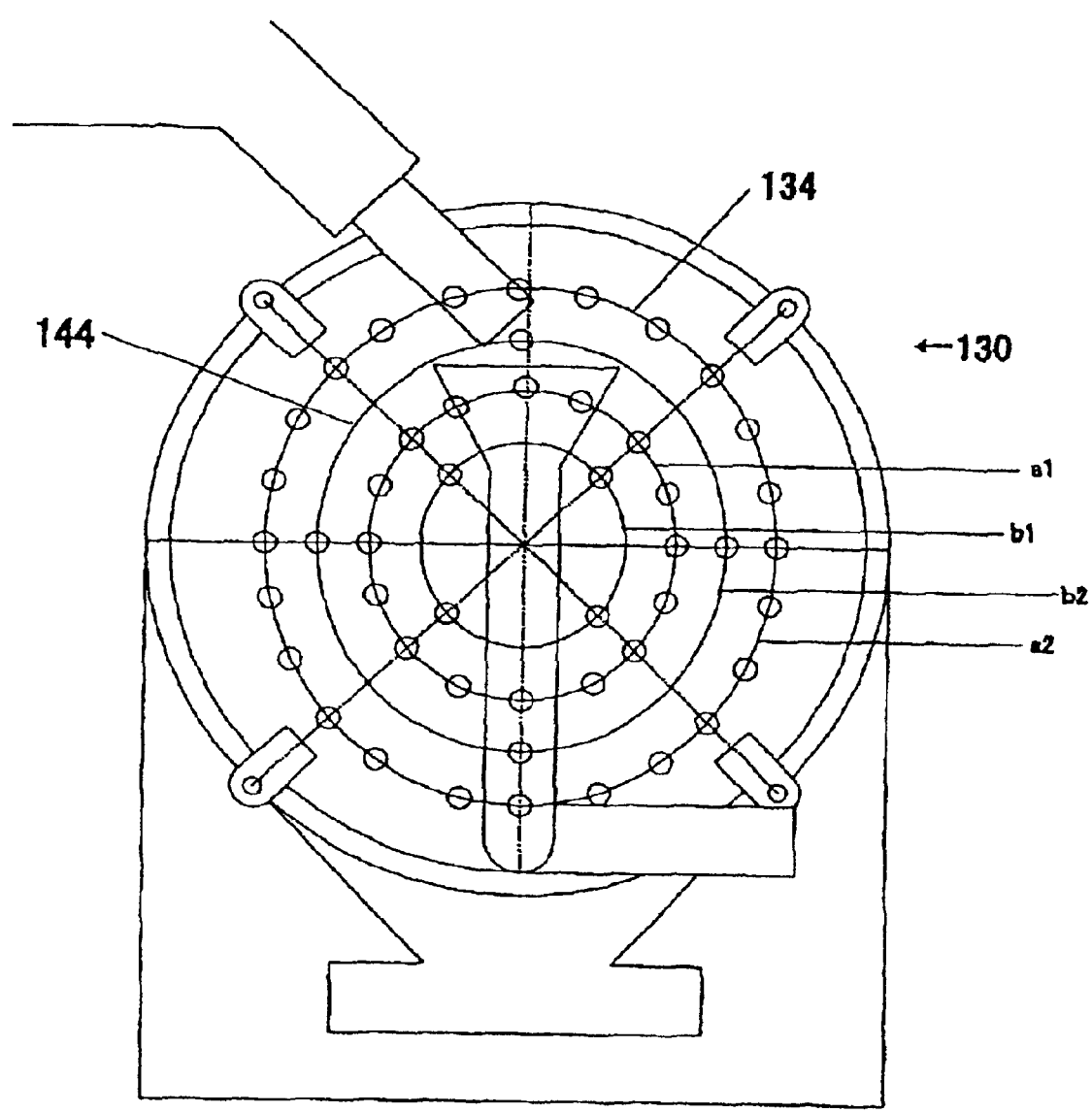
FIG. 5 is a partly sectional view taken on line V—V of FIG. 3.

An example of configuration of the means for separating, classifying and size regulating of particles used in the present invention (for convenience, called "cleaning separator" in the present embodiment) is shown in FIGS. 3 through 5.

First, explanation will be given for the outline of the entirety of a cleaning separator 130: the cleaning separator 130 is equipped with a supply charging port 132 for charging with each of the coated particles 82, a collection port 153 for collection of synthetic wood materials from which encrusted materials, such as concrete still encrusted to the coated particles 82, have been peeled and eliminated by treating the coated particles 82 inside the cleaning separator 130, and a discharge port 152 to discharge encrusted materials peeled from the previously mentioned coated particles 82, and dust and the like generated by trimming the coated particles 82 themselves by applying scraping impact force.

The coated particles 82 processed through the previously mentioned crushing step are supplied to the previously mentioned supply charging port 132. The previously mentioned collection port 153 communicates with the supply charging port 132 via a communicating pipe 235. Piping 236 communicates with the collection port side of the communicating pipe 235, from a compressed air supply source not shown. A flow regulating plate is installed at the communication site with this piping 236, and is configured to allow mainly compressed air to flow to the supply charging port 132. In addition, the communicating pipe 235 is branched, and a branch pipe 237 is installed for transferring to a recovery tank 240 to recover granulated synthetic wood materials 83. At the branch point of this branch pipe 237, for example, a three way electromagnetic valve 238 is installed, which can be switched at adequately set times using a timer circuit.

On the other hand, the previously mentioned discharge port 152 is communicating with a collecting tank 250 through a discharge pipe 239, and is configured in such a way that dust 84 consisting of, for example, encrusted materials crushed and transformed into fine powders, and powders of synthetic wood materials generated by trimming the coated particles 82 themselves, is discharged from the discharge port 152, is aspic into the discharge pipe 239, to which a blower 157 is separately installed, and recovered in the collecting tank 250.

In FIGS. 3 to 5, explanation on a cleaning separator 130 is as follows: the cleaning separator 130 used in the present embodiment is a small type experimental apparatus, and has a processing capacity of 160 kg/h for the previously described coated particles 82.

The previously described supply charging port 132 of this cleaning separator 130, is connected to, and opens into, the central portion of a fixed disk 131 having a diameter of 400 mm, a fixed terminal plate 133 closes the processing space 155 and faces the previously mentioned fixed disk 131, and the respective peripheral outer edges of the previously mentioned fixed disk 131 and of the fixed terminal plate 133 are fixed with a peripheral plate 135.

In the previously mentioned processing space 155, the fixed terminal plate 133, and a mobile disk 141 having approximately the same diameter as the fixed terminal plate 133 are installed, the mobile disk being driven into rotation by a horizontal rotation shaft 142, and the horizontal rotation shaft 142 being supported by each bearing 143 and 143. The previously mentioned horizontal rotation shaft 142 is driven into rotation by a rotation driving means such as a motor 161, which, in the present embodiment, as one example, is rotated at 750 min$^{-1}$.

Then, each fixed pin 134 is sequentially planted onto the previously mentioned fixed disk 131 at several rotation loci a1–a6 (FIG. 5) which are concentric (relatively to the corresponding mobile disk 141). On the other hand, each mobile pin 144, distinct from each of the previously mentioned fixed pins 134, is sequentially planted onto the previously mentioned mobile disk 141 at several rotation loci b1–b6, inserted alternately between the rotation loci of each of the previously mentioned fixed pins 134. This arrangement makes it possible to obtain a step wherein encrusted materials such as concrete encrusted on the surface of coated particles 82 are peeled or separated, and a step wherein coated particles 82 are granulated into spheres, by the scraping impact force between each of these fixed and mobile pins 134 and 144.

More specifically, the number of fixed pins 134 is 16 at the rotation locus a1, which is close to the central portion of the fixed disk 131, and 24 are planted at the rotation locus a2, which is situated at the periphery of the previously mentioned rotation locus a1.

On the other hand, the number of fixed pins 144 is 4 at the rotation locus b1, which is close to the central portion of the mobile disk 141, and 4 are planted at the rotation locus b2, which is situated at the periphery of the previously mentioned rotation locus b1.

In actuality, enlarging the clearance between each of the previously mentioned fixed and mobile pins 134 and 144 weakens the scraping force applied on the coated particles 82, and reducing the clearance strengthens the scraping force.

In addition, in FIG. 3, on the peripheral outer side of the mobile disk 141 and on the peripheral inner side of the previously mentioned peripheral plate 135, a specific mesh screen 151, in which pores have been punched, is installed peripherally; closing a discharging space 156, and a discharge port 152 is installed below the discharging space 156. In addition, in the present embodiment, the previously mentioned screen 151 is a mesh having, as one example, pores with a diameter of 1.2 mM.

In addition, a collection port 153 is installed at the lower part inside the screen 151 of the processing space 155. This collection port 153, as previously described, is communicating with the supply charging port 132 through a communicating pipe 235, and is communicating with the recovery tank 240 for recycling the recycled granulated synthetic wood materials 83, through a branch pipe 237 which branches the supply charging port side of the communicating pipe 235. In addition, as another example, a plug valve for controlling opening and closing may be installed on the previously mentioned collection port 153, and the collection port 153 may be connected to the supply charging port 132 through a blower 158 which aspirates the air inside the cleaning separator 130, as shown in FIG. 1.

Figure 6:
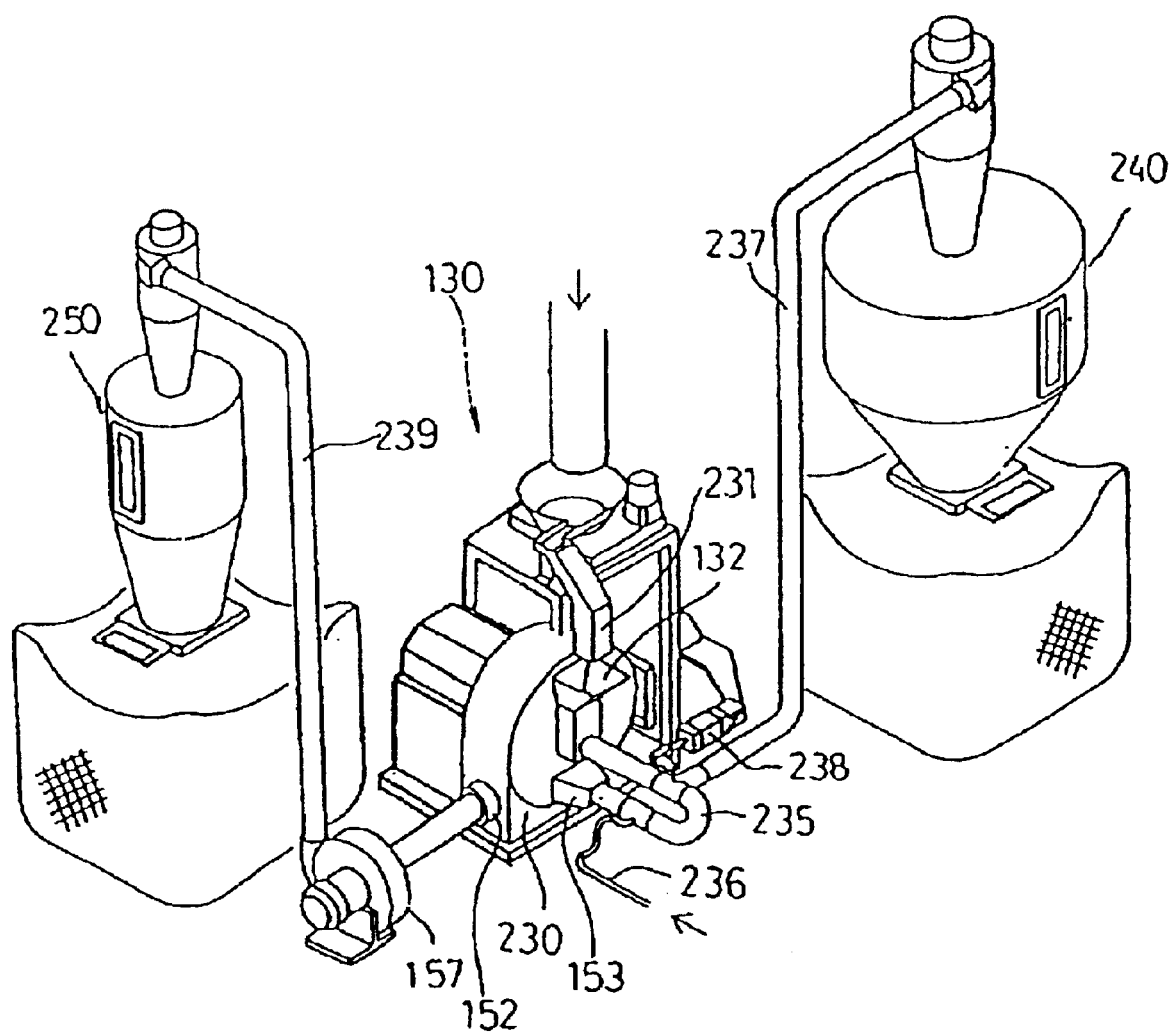
FIG. 6 is an overall perspective view of the means for separating, classifying and size regulating of particles (cleaning separator), and of each apparatus related to this cleaning separator, used in the embodiment of the present invention.

Therefore, in the above mentioned cleaning separator 130, when each coated particle 82 is supplied to the supply charging port 132 by rotating the mobile disk 141 with the horizontal rotation shaft 142 which is rotated by the rotation driving means of the motor 161, each coated particle 82 is at the central portion of the processing space 155, and each coated particle 82 is struck by the scraping impact force between each of the fixed and mobile pins 134 and 144 and by the impacts from each of the fixed and mobile pins 134 and 144, and in addition, by rubbing each of the pins 134 and 144 against the surfaces of the coated particles 82, or by rubbing the surfaces of the coated particles 82 against each other, the surfaces of the coated particles 82 are scraped in such way that encrusted materials, as well as deteriorated synthetic wood materials which are encrusted on the surfaces, are finely crushed into dust form, and are peeled from the surfaces of the particles 82. In addition, by the application of this scraping impact force, a portion of the surfaces of the coated particles 82 themselves are trimmed and transformed into powder from, and at the same time as being peeled together with encrusted materials, they are granulated into approximately spherical forms, and form the granulated synthetic wood meal materials. The encrusted materials peeled from the previously mentioned coated particles 82 and the dust 84 generated by trimming the coated particles 82 as described above, pass through the screen 151 under the centrifugal action of each mobile pin 144, are classified into the discharging space 156, and from the discharge port 152 and through the blower 157 (FIG. 6) they are then aspirated and discharged to the exterior.

In addition, in the present embodiment, encrusted materials peeled from the previously mentioned coated particles 82, and synthetic wood materials in dust form generated by trimming the coated particles 82 themselves, are aspirated together with the air inside the cleaning separator 130, at 15 kw, 460 mm Aq pressure and 65 ml/minute aspiration speed for large machines, at 3.7 kw, 460 mm Aq pressure and 51 ml/minute aspiration speed for medium machines, and at 1.5 kw, 400 mm Aq pressure and 3.4 m$^3$/minute aspiration speed for small machines, as the previously mentioned blower 157.

On the other hand, coated particles 82 of sizes which do not pass through the screen 151 accumulate inside the screen 151. Coated particles 82 with encrusted materials still encrusted on their surfaces are mixed among the coated particles 82 from which these encrusted materials have been eliminated. However, since the collection port 153 and the supply charging port 132 communicate with each other through the communicating pipe 235, the coated particles 82 extracted from the collection port 153 flow back to the supply charging port 132, repeatedly scraped in the cleaning separator 130 by receiving scraping impact forces again, encrusted materials such as concrete, encrusted on the surfaces of the coated particles 82 are peeled from the coated particles 82, and only the synthetic wood materials constituting the coated particles 82 remain.

Although the coated particles 82, from which encrusted materials have been eliminated as described above, flow back, the majority remain inside the screen 151 without being scraped up to a point so as to pass through the screen 151. The above step of separation, classification and size regulation can be reiterated several times as needed until the encrusted materials of the coated particles 82 within one batch are separated.

By driving the above cleaning separator 130 with the motor 161, opening the downstream side with a three way electromagnetic valve 238 and closing the side of the previously mentioned branch pipe 237, of the previously mentioned communicating pipe 235, and by providing compressed air from piping 236 to the communicating pipe 235, an air flow is generated by the compressed air, circulating from the communicating pipe 235 to the supply charging port 132, the processing space 155, the collection port 153, and the communicating pipe 235, successively. When each coated particle 82 within one batch is supplied through the supply pipe 231 to the supply charging port 132, at the same time as the coated particles 82 are granulated into approximately spherical forms by the scraping impact forces applied to the coated particles 82, powders formed by finely crushing encrusted materials which are peeled from the surface of the coated particles 82 by the processing inside the cleaning separator 130, and the dust 84 formed from synthetic wood materials or the like generated by trimming one portion of the coated particles 82 themselves, said powders and dust pass through the screen 151 and are discharged to the collecting tank 250 by the blower 157, on the other hand, the coated particles 82 remaining inside the screen 151 are aspirated into the communicating pipe 235 by the circulating air flow and are again fed into the processing space 155, processed inside the cleaning separator 130, and this suite of step is repeated over several times as needed until the encrusted materials on the surfaces of the coated particles 82 of one batch are peeled.

Then, after the above mentioned processing is complete, by closing the downstream side of the communicating pipe 235 with the three way electromagnetic valve 238 and by opening the side of the previously mentioned branch pipe, the granulated synthetic wood meal materials remaining inside the screen 151, and formed by size regulating the coated particles 82 which traveled from the communicating pipe 235 through the branch pipe 237 into approximately spherical forms, are recycled in the recovery tank 240.

Furthermore, as an alternative to the above mentioned three way electromagnetic valve 238, an electromagnetic valve which opens and closes the previously mentioned branch pipe 237 and an electromagnetic valve which opens and closes the down stream side of the previously mentioned communicating pipe 235 may be installed, and set up so that these two electromagnetic valves to open and close alternately.

(Fine Classification Step)

In the previously mentioned step of separation, classification and size regulation, encrusted materials such as concrete encrusted on the coated particles are peeled from the surface of the coated particles, and at the same time are classified from the synthetic wood materials crushed and granulated into approximately spherical forms by the scraping impact forces applied in the previously mentioned step. However, in the event that dust 84 of encrusted materials and the like generated by crushing with these scraping impact forces is not completely recycled in the preceding step, and dust 84 exists still mixed among the granulated synthetic wood meal materials 83, these recycled granulated synthetic wood meal materials 83 are sifted through a sieve 100 of the present step, and the dust 84 mixed among the granulated synthetic wood meal materials 83 is eliminated.

The sieve 100 used in the present step may have any configuration, provided it can eliminate fine powder of encrusted materials mixed among the granulated synthetic wood meal materials, as previously described, and various conventional sieves may be used. As one example, in the present embodiment, a vibratory sieve (Sato model vibratory sieve made by Mie Industry Co., Ltd.) is used as this sieve 100.

In addition, in the present step, a sieve equipped with a screen having a grid spacing of between 1 to 5 mm, preferably of between 2 to 4 mm, and actually of 3 mm in the present embodiment, is used.

In this way, the granulated particle resin materials 83 recycled through the previously mentioned step of separation, classification and size regulation, are sifted through the sieve 100 of the present step, such that dust of encrusted materials and synthetic wood materials, which passed through the screen, are eliminated, and the granulated synthetic wood meal materials, which did not pass through the screen and remained above the sieve, are recycled as regeneration materials for sheathing boards.

(Drying Step)

The present step is a step wherein the granulated synthetic wood meal materials 83, recycled as regeneration materials through the previously mentioned fine classification step, are dried to a moisture content of less than 0.1 wt %.

This is because the sheathing board 1*a* of the present invention contains an important amount of cellulose crushed materials such as wood meal, and there are cases where moisture is absorbed when used as the concrete form 50, or during storage, and when the granulated synthetic wood meal materials 83 which have been granulated in a condition wherein moisture has been absorbed in this way are directly used as regeneration materials, regeneration of the sheathing board 1b can not be performed optimally.

This drying step is performed using a conventional dryer 102, and in the present embodiment, a dryer made by Matsui MFG Co., Ltd. is used as this dryer 102. If the granulated synthetic wood meal materials recycled in the previously described way, are dried in this dryer for approximately 1 hour at a temperature of, in the present embodiment, 90° C., the granulated synthetic wood meal materials 83 with a moisture content of approximately 1.8 wt % before processing is dried to a moisture content of less than 0.1 wt %, and become adequate as regeneration materials for the sheathing board 1b.

In addition, the previously mentioned drying temperature was set to 90° C. in the present embodiment, since the granulated synthetic wood meal materials 83 melt when drying the granulated synthetic wood meal materials 83 at a temperature of greater than 90° C., and, when performing drying at lower temperatures, processing by the present step requires a longer time. In addition, if the moisture content of the granulated synthetic wood meal materials 83 after drying is greater than 0.1 wt %, the quality of the regenerated sheathing board decreases. However, for those materials which can dry to a lower moisture content than previously described, the previously mentioned drying temperature, the processing time and the like, can be suitably changed according to the type of resin constituting the granulated synthetic wood meal materials 83 which is the processing object, and other various conditions.

In addition, in the apparatus indicated in the above mentioned embodiment, 211 kg (including encrusted materials) of previously used recycled sheathing board was processed, and 117.4 kg of dried granulated synthetic wood meal materials could be obtained. This recycled granulated synthetic wood meal material was 55.6% of the weight (including encrusted materials) of the sheathing board transformed into raw materials, and the synthetic wood materials could be recycled with a high recycling rate.

(Molding Step)

The granulated synthetic wood meal material 83, recycled and dried in the above described way, is regenerated again into, as one example, the sheathing board 1b for use in a concrete form, either directly, or mixed with thermoplastic resin materials, which are either virgin or disposed of and recycled, and cellulose crushed materials, the synthetic wood materials having a moisture content of within 15 wt %, wherein between 20 and 75 wt % of cellulose crushed materials, such as wood meal with particle diameters of between 50 and 200 μm, and between 25 and 80 wt % of thermoplastic resin molding materials, are mixed.

Figure 7:
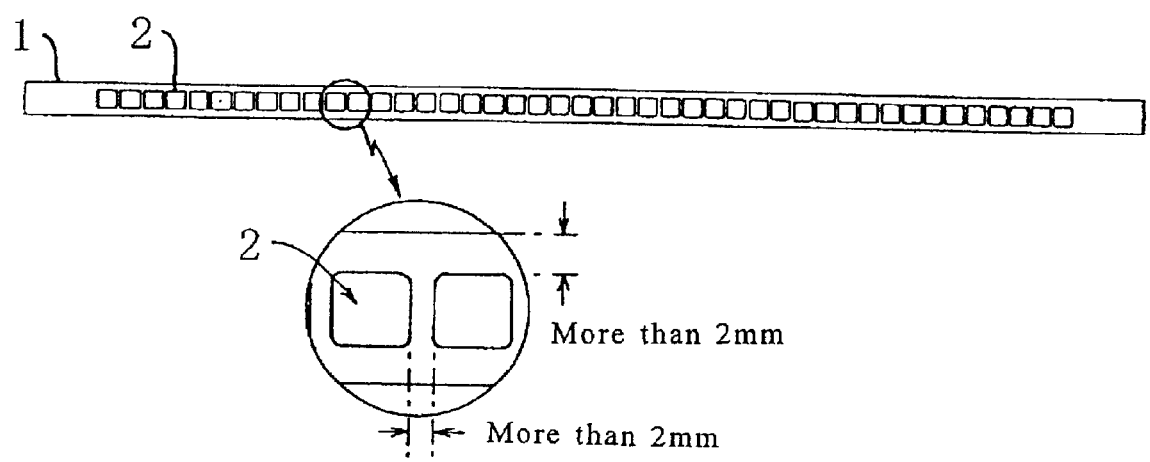
FIG. 7 is a front view showing a sheathing board of the present invention.

In FIG. 7, numeral 1 is a sheathing board for use in a concrete form of the present invention, fabricated with the previously mentioned recycled synthetic wood materials as raw materials. This sheathing board 1 is a sheathing board having the granulated synthetic wood meal materials 83 recycled in the previously described way as molding materials, and formed by molding this granulated synthetic wood meal materials 83 through extrusion molding to form hollow chambers within the thickness of the board.

The granulated synthetic wood meal materials 83 recycled in the previously described way, while being heated and kneaded by an extruder, are extruded into a molding die, and are molded so as to have a thickness of between 12 and 50 mm, preferably of between 12 and 15 mm, more preferably of between 16 and 20 mm, a width of between 300 and 900 mm, preferably of between 600 and 900, more preferably of 600 mm, and a length of between 1500 and 2000 mm, preferably of between 1500 and 1800 mm, and more preferably of 1800 mm.

In the previously mentioned sheathing board 1, several hollow chambers 2 are formed in the direction of its length, and the previously mentioned hollow space is formed in such a way such that the thickness of each wall delimiting these hollow chambers 2 is at least greater than 2 mm, preferably between 3 mm and 6 mm, and the hollowness is between 20 and 70%. In addition, here, the hollowness is the proportion of the volume of the hollow chambers 2 with respect to the total volume of the sheathing board comprising the hollow chambers 2.

(Extruder)

Figure 8:
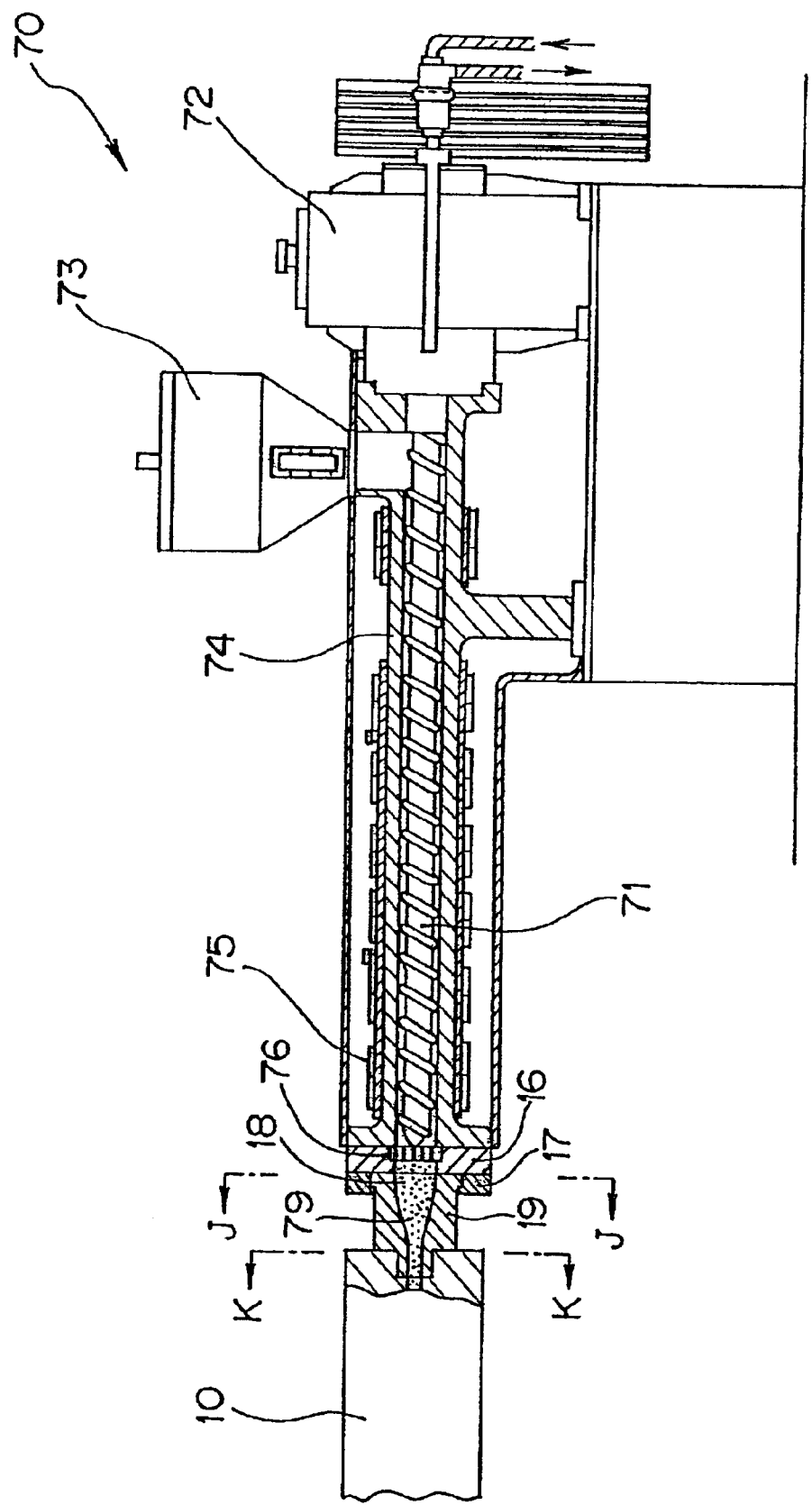
FIG. 8 is a partial front sectional view of an extruder in the embodiment of the present invention.
Figure 9:
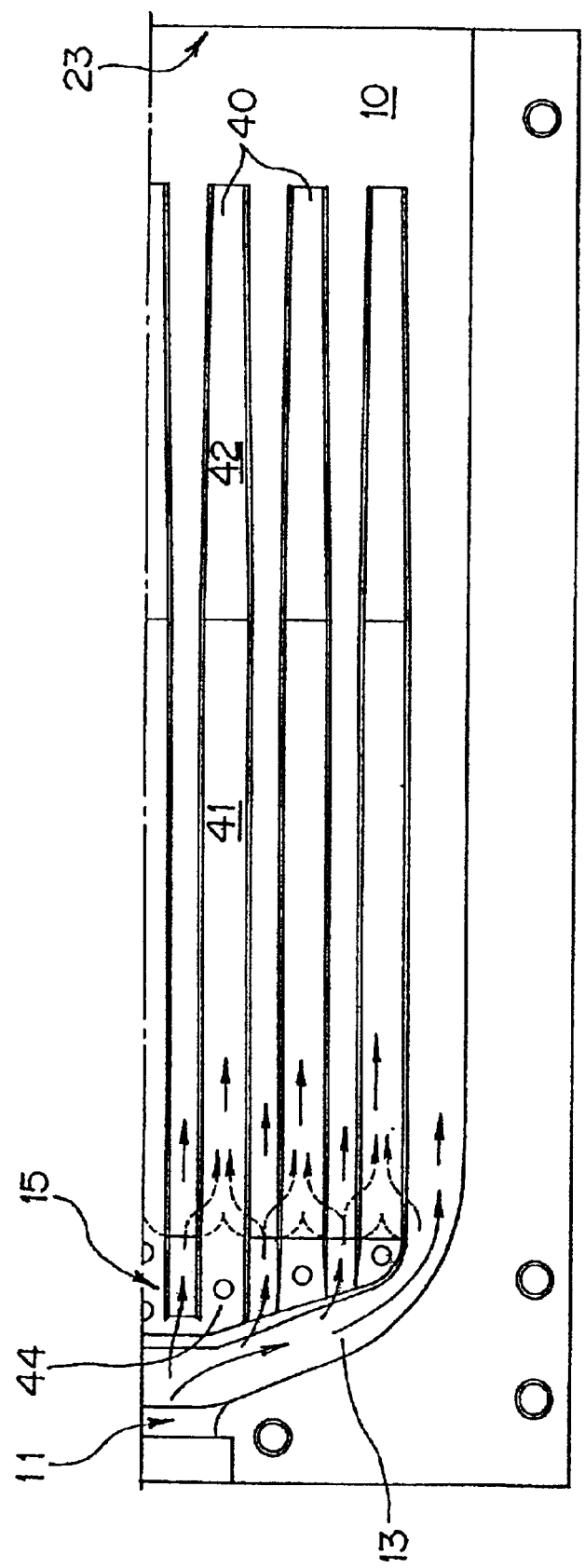
FIG. 9 is a partial plan view of a molding die in the embodiment of the present invention.

In FIG. 8, numeral 70 is a single shaft extruder. However, in general, an extruder is of screw type, available as a single shaft extruder or a multiple shaft extruder, and it is available having a structure which is a variation of these or a combination of these, and any of these extruders may be used for the present invention.

Numeral 71 is a screw of single shaft type. This screw 71 is driven through a speed reduction gear 72 by a motor not shown, and rotates inside a barrel 74. The granulated synthetic wood meal materials 83 charged from a hopper 73 are kneaded by this screw 71 in rotation and are extruded to the front of the screw 71. A band heater 75 is installed on the outer surface of the barrel 74, and the granulated synthetic wood meal materials 83 inside the barrel 74 are heated by this band heater 75, while being gradually melted and kneaded along the groove of the screw 71 and conveyed to the front. Then, through a screen 76 and an adapter 17, the kneaded materials are extruded, as an extruding materials 79, from an extruding die 19 of the adapter 17 to a molding die 10.

(Extruding Die)

Figure 17:
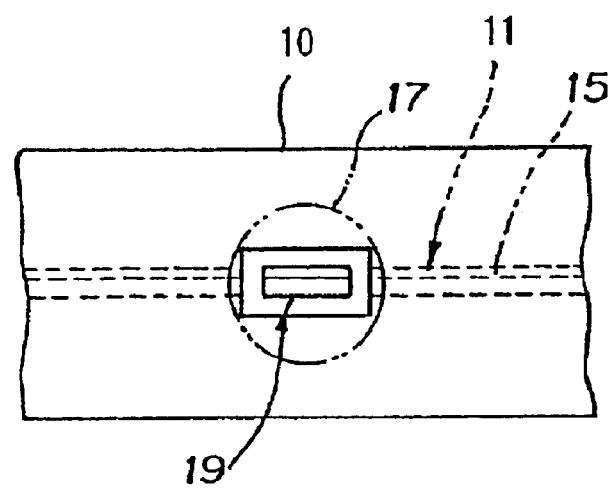
FIG. 17 is a longitudinal sectional view taken on line K—K of FIG. 8.

In FIG. 8, the extruding die 19 at the front end of the barrel 74, forms an elongated rectangular shape equipped with an ejection port 50 mm wide and 18 mm high, which has a front end formed with a thickness of 8 mm (see FIG. 17). On the inside, a communicating hole is formed, wherein the cross section changes gradually from an inflow port 18 of the rear end face of the adapter 17 having a diameter of 50 mm, to the ejection port of the previously mentioned extruding die 19. In addition, it is preferable that the inflow port 18 is formed with the same size as the circular cross section of the ejection port of the extruder 70, while on the other hand it is preferable that the width of the rectangular shape of the extrusion die 19 is formed with the same size as the diameter of the inflow port 18, and its height is formed with the same size as the height of a molding chamber 22 of the molding die 10 described later.

In addition, the adapter 17 and the extruding die 19 may be formed in various sizes according to the size of the extruder 70. For example, if the diameter of the inflow is 150 mm, the width of the rectangle of the extruding die 19 may be of 150 mm and the height may be the same as the height of the molding chamber 22, which is of 18 mm.

The inflow port 18 of the adapter 17 and the screen portion of the extruder 70 communicate by connecting the rear end of the previously mentioned adapter 17, through a fixture interlocked at the outer periphery of said adapter, to the front end face of the screen portion equipped with a screen 76 (FIG. 8) of the extruder 70, with fasteners such as bolts. On the other hand, the extruding die 19 and the lead-in portion 11 of a molding die 10 communicate by mounting the front end of the ejection port having a rectangular cross section, of the front end of the extruding die 19, onto the lead-in portion 11 having a rectangular cross section formed at an approximately central position of the rear end of the molding die 10.

In addition, a heater serving as a heating means may be buried inside the surrounding wall of the communicating hole of the previously mentioned adapter 17. In this case, the extruded materials 79, extruded from the outlet of the screen portion 16 of the extruder 70, flow in from the inflow port 18 of the adapter 17, while being heated and maintained at temperature by the heater, and flow through the communicating hole from the extruding die 19 into the lead in portion 11 of the molding die 10. Such a flowing state of the extruded materials 79 is excellent. In addition, the previously mentioned extruding die 19 differs from a typical general die, having a large ejection port allowing for a large amount of melted raw materials (synthetic wood meal) to be delivered, and moreover, it is formed into a shape wherein promoting compaction becomes possible, which means that clogging of the die as was occurring with a typical die does not occur.

(Molding Die)

In FIG. 9 to FIG. 12, numeral 10 is a molding die, and consists of a lead-in portion 11 which pushes out the extruded materials 79 delivered from the ejection port of the extruding die 19 having a rectangular cross section, of the extruder 70, and a molding chamber which molds the extruded materials 79 pushed out from the lead in portion 11 into a board form having a wide width and a specific thickness, in the present embodiment, a molding chamber 22 forming an elongated rectangular cross section with a width of 600 mm and a height of 18 mm.

Numeral 11 is the lead-in portion, formed inside the molding die 10, in the direction of the width of the molding die 10, formed with a width approximately equal to or slightly larger than the previously mentioned extruder die 19. The shape of the horizontal cross section is formed into a so called coat hanger type wherein both edges of the lead in chamber 13, which extend by curving towards the direction of the width of the molding die 10, reach both edges of the long direction of the molding chamber 22.

In addition, although the previously mentioned lead-in chamber 13 may be formed into a straight manifold type, in addition to the coat hanger type, the previously described curved shape coat hanger type is preferred, owing to the excellent fluidity of the extruded materials 79 flowing inside the lead in portion 11 and the lead in chamber 13.

In addition, a sheet 24 formed with fluororesin described later is preferably affixed on the previously mentioned lead in portion 11 and the lead in chamber 13.

In addition, the previously mentioned molding chamber 22 is formed into a square cross section by metal spacers, not shown, wherein two metal plates, one upper and one lower, having a heating and a cooling means, are placed at the border of both sides, and adjustments may be made by exchanging the previously mentioned spacers, to obtain any target thickness for the hollow resin molded board.

The molding die 10 has, as one example, an elongated rectangular cross section with a width of 600 mm and a height of 18 mm, and a distance from the inlet of the molding chamber 22 to the die outlet 23 (the distance in the direction of pushing out) of 1,000 mm.

(Constructions Inside the Molding Die)

On the inner wall surfaces in the four directions that are above, below, to the right and to the left of the previously mentioned molding chamber 22, the sheet 24 made of fluororesin and 0.25 mm thick is affixed. Alternatively, it is possible to directly coat the inner wall surfaces in the four directions that are above, below, to the right and to left of the molding chamber 22 with fluororesin, but it is particularly preferable to affix fluororesin sheets 24, considering the points that their replacement is easy, the step of coating them with fluororesin is easy, and their durability is excellent.

Particularly preferably, the previously mentioned sheet 24 is a sheet made of glass woven fabric with a film of fluororesin coated on its surface. As described above, teflon TFT, teflon FEP, teflon CTFE, teflon Vdf or the like, are available as fluororesin. In addition, the previously mentioned glass woven fabric may be a non woven fabric of glass fibers.

In addition, the previously described step of coating with fluororesin may be performed on the upper and lower inner surfaces of the molding chamber 22, in other words, on the inner wall surfaces corresponding to the surfaces which form the front and the back surfaces of the hollow resin molded board forming the sheathing board. However, it is desirable that it be performed on all of the upper, lower, right and left inner surfaces of the molding chamber 22, as described previously.

Figure 10:
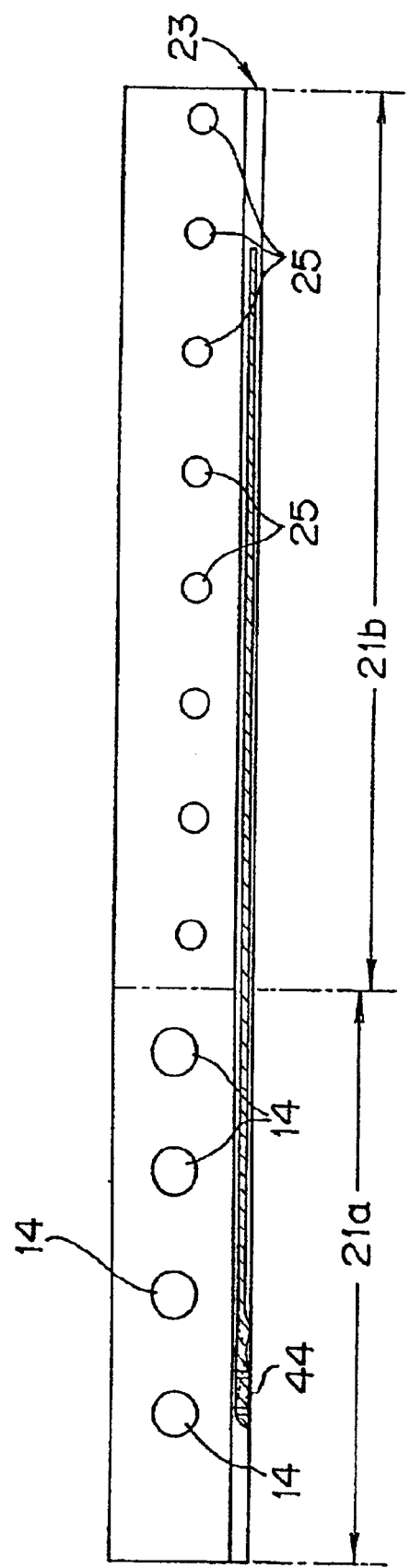
FIG. 10 is a center longitudinal sectional view of a molding die in the embodiment of the present invention.
Figure 11:
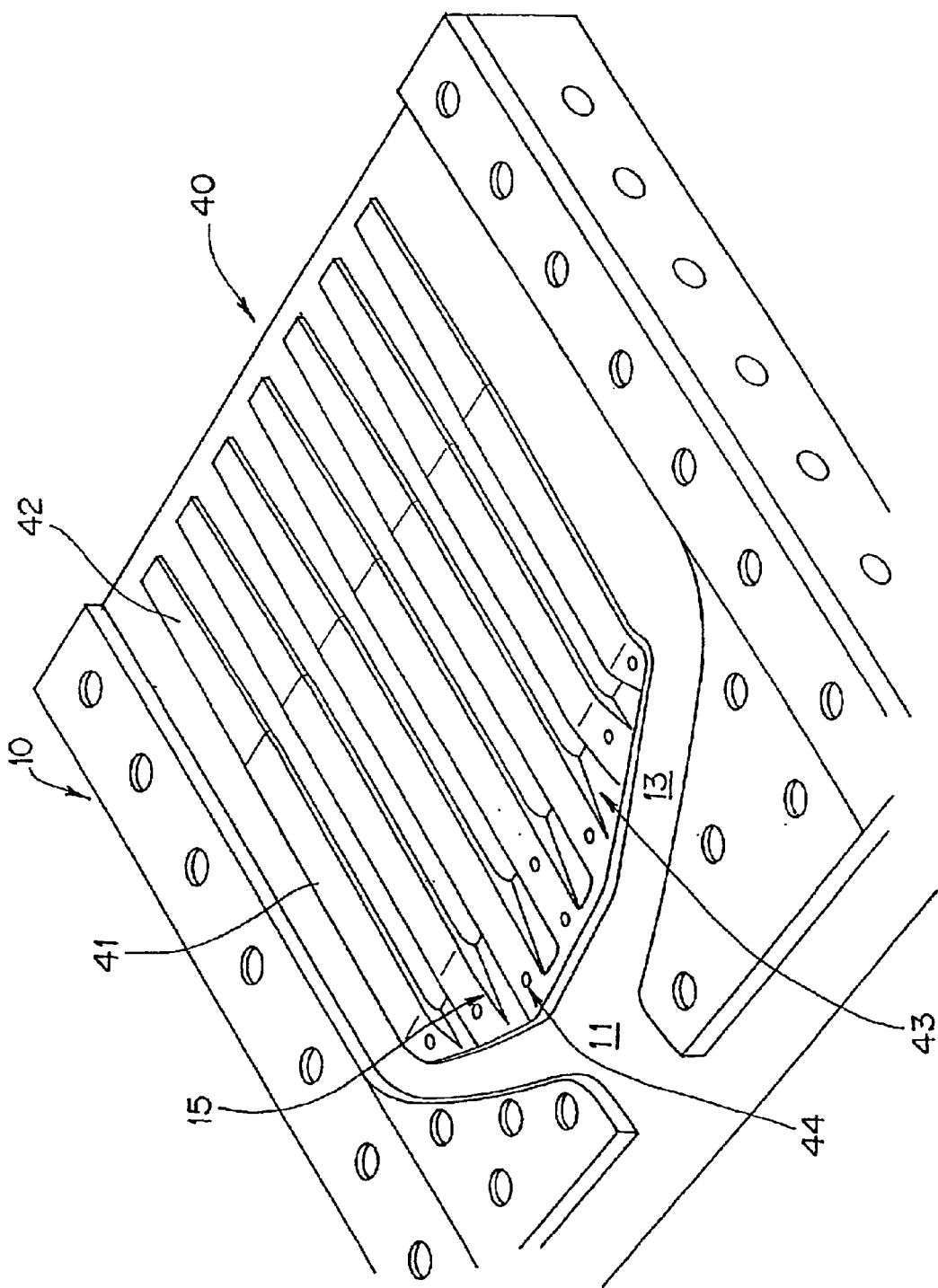
FIG. 11 is a perspective view of a molding die in the embodiment of the present invention.

In FIG. 10, numerals 14 are heaters, which consist of a heating means such as electrically heated heaters, and are installed as piping, by inserting four such heaters at equal intervals into the molding die 10 above and below the molding chamber 22, corresponding to the melting section 21a containing the lead in portion 11 spanning one fourth of the longitudinal direction of the whole molding die 10, for heating and maintaining the temperature of the extruded materials 79, and for sustaining the fluidity of the extruded materials 79.

In addition, numerals 25 are cooling pipes, representing one example of cooling means to cool the annealing section 21b of the molding chamber 22 of the molding die 10, to cool the extruded materials 79 inside the molding chamber 22, by supplying the cooling pipe 25, at appropriate intervals in the pushing out direction of the molding chamber 22, with a cooling liquid serving as a cooling medium, such as water at room temperature, or water up to approximately between 70 and 80° C., or oil. The pipes of these cooling pipes are installed as piping, by inserting 8 such pipes at equal intervals in the molding die 10 above and below the molding chamber 22, in the annealing section 21b accounting for three fourths in the direction of the die outlet 23 of the molding die 10, to improve the annealing effect inside the molding chamber 22 on the extruded materials 79. In addition, although the cooling pipes 25 may be installed by gradually narrowing the intervals, or, the cooling pipes 25 may be placed on the outer wall of the molding die 10, the construction is not restricted to this construction since it suffices to cool the extruded materials 79 inside the molding chamber 22.

(Core)

In FIG. 9 to FIG. 12, explanation is given on the core 40 used when fabricating the sheathing board for use in a concrete form wherein hollow chambers are formed with a defined interval in the thickness. The core 40 is integrated with a base portion 44, having an arc shaped cross section, and a guiding portion 15 provided with an inclined part 43 which is inclined in the direction of the die outlet 23. The core 40 consists of a molding guide portion 41, located in the melting portion 21, formed by an approximately half portion situated on the side of the guiding portion 15, forming an overall shape of approximate comb teeth, with seven rod shaped members having a rectangular cross section, and a total length of 800 mm and a width of 35 mm, and an extraction guide portion 42 located in the annealing portion 21b, wherein a taper of one thousandth is formed in both the thickness and width, from this molding guide portion 41 and in the direction of the die outlet.

The previously mentioned guiding portion has, in the lead-in chamber of the previously mentioned molding die, a total length of between 70 and 95% of the total length in the direction of the width of said lead in chamber. Moreover, it is preferably set at less than 70% of the height of said lead in portion, and one fourth of it, from the guiding portion 15 of core 40 in the direction of the front end die outlet 23, is located in the melting portion 21a of the molding chamber 22, and the remainder is located in the annealing portion 21b.

In addition, the molding guide portion 41 of the previously mentioned core 40, is formed linearly with a thickness of less than 45% of the height of the previously mentioned molding die, with the same thickness at the center of the molding die. The thickness of the extraction guide portion 42 is tapered in the direction of the front end of the die outlet 23.

Then, the previously mentioned core 40 is respectively aligned into several columns parallel to the longitudinal direction of the molding chamber 22, in other words parallel to the direction of the pushing out, with an interval of four sevenths of the width of the core 40.

Figure 12:
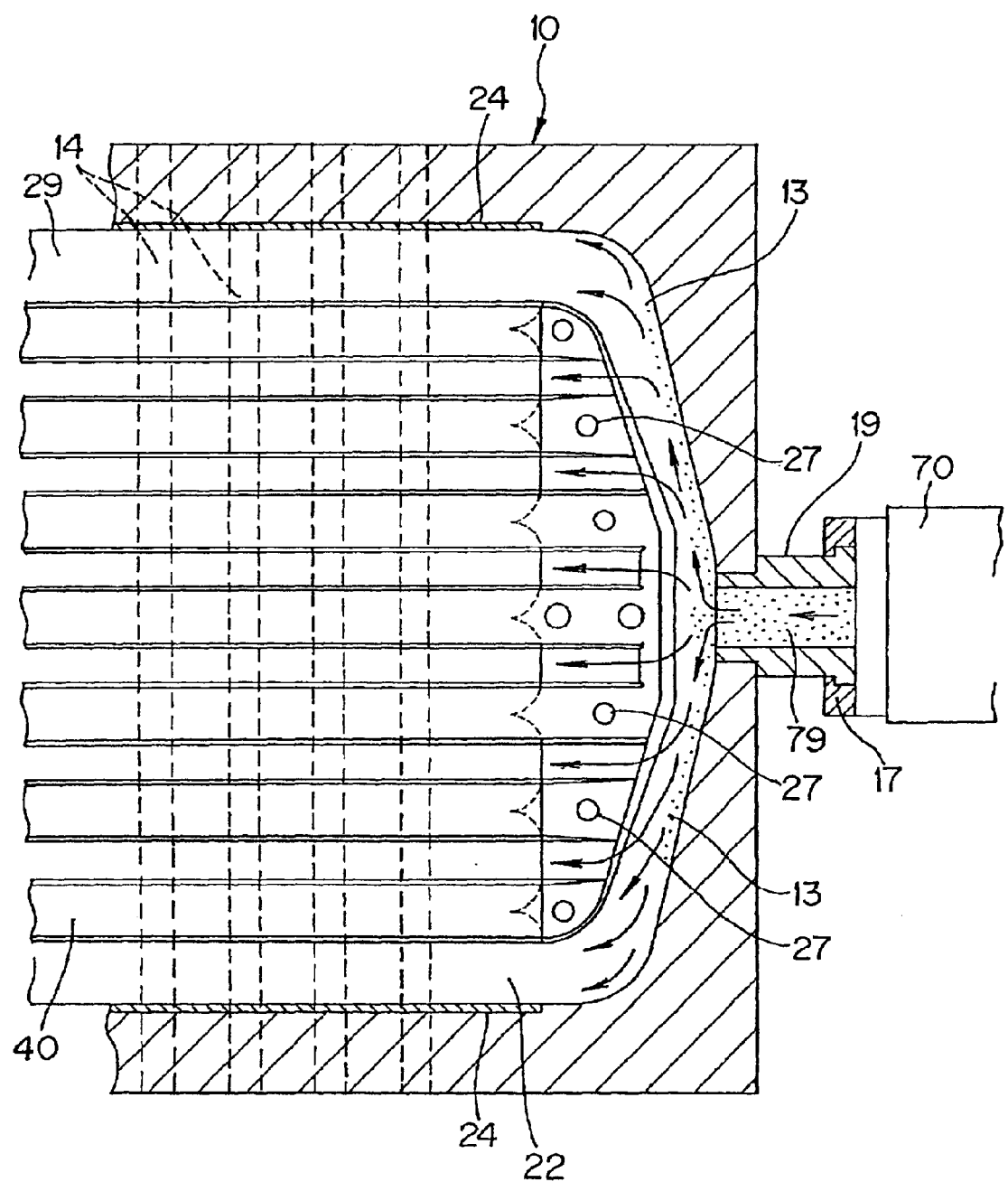
FIG. 12 is a plan view showing a section of main parts of a molding die in the embodiment of the present invention.
Figure 13:
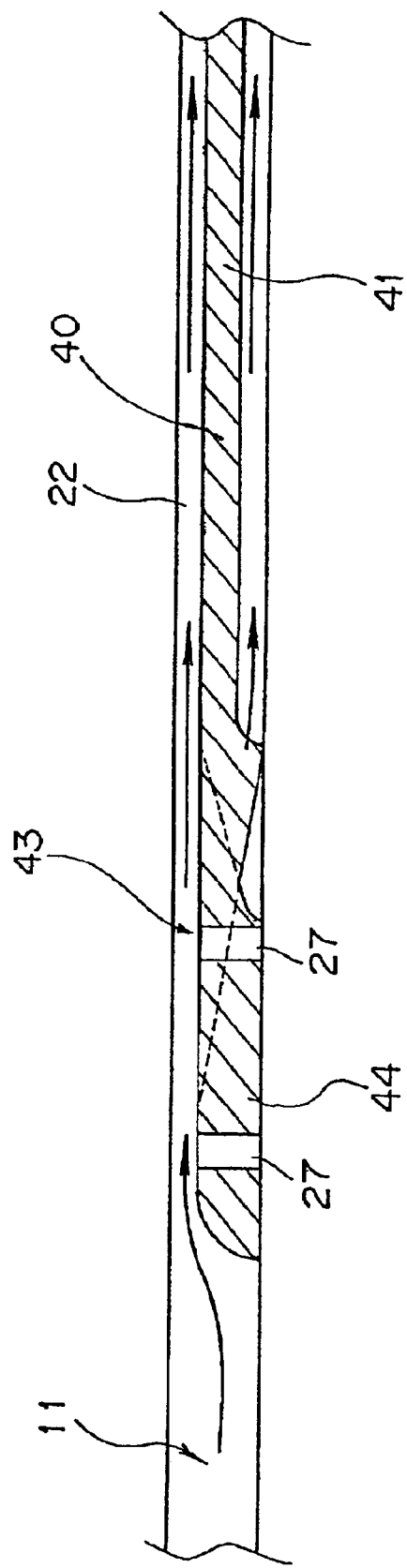
FIG. 13 is a partly sectional view of a molding die in the embodiment of the present invention molding die.

The previously mentioned guiding portion 15 and core 40, have all the outer surfaces affixed with sheets made of fluororesin such as teflon, with a thickness of between 0.1 and 0.5 rnm. This guiding portion 15 is placed inside the previously mentioned lead in chamber 13 with a height of 18 mm and a width of 600 mm, approximately in the center, creating an interval of 28.5 mm each, in the direction of the width of the lead in chamber 13 and both ends in the direction of the width of the molding chamber. In addition, the back end side of the guiding portion 15 is placed so as to obtain an interval approximately parallel to the surface of the front end wall of the lead in portion 11, this guiding portion 15 being fastened to the molding die 10 on the surface below the lead-in chamber 13 with bolts 27 as shown in FIG. 12. Therefore, a gap is also formed between the upper surface of the guiding portion 15 and the upper surface of the lead-in chamber 13.

In addition, the thickness of the plates, and the width and the interval of the guiding portion 15 and the core 40, may be suitably selected according to the capacity of the molding chamber 22. In the present embodiment, 42 cores 40 having a square form cross section of 10×10 mm are placed with a spacing of 3 mm.

If no core 40 is installed in the above mentioned molding die 10, an immaculate sheathing board is fabricated.

(Coarsely Crushing Means)

Figure 14:
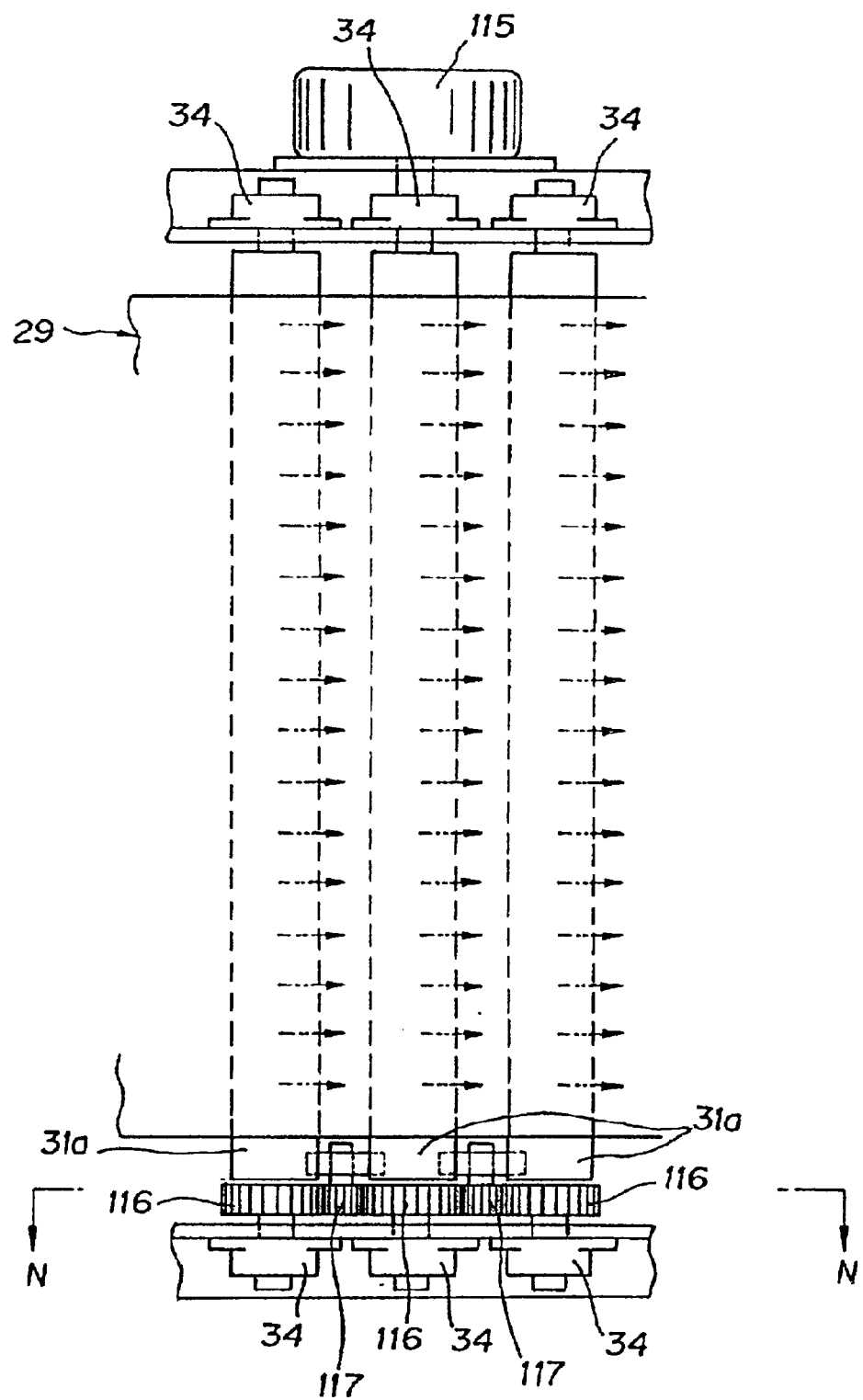
FIG. 14 is a partly sectional plan view of a coarsely crushing means in the embodiment of the present invention.
Figure 15:
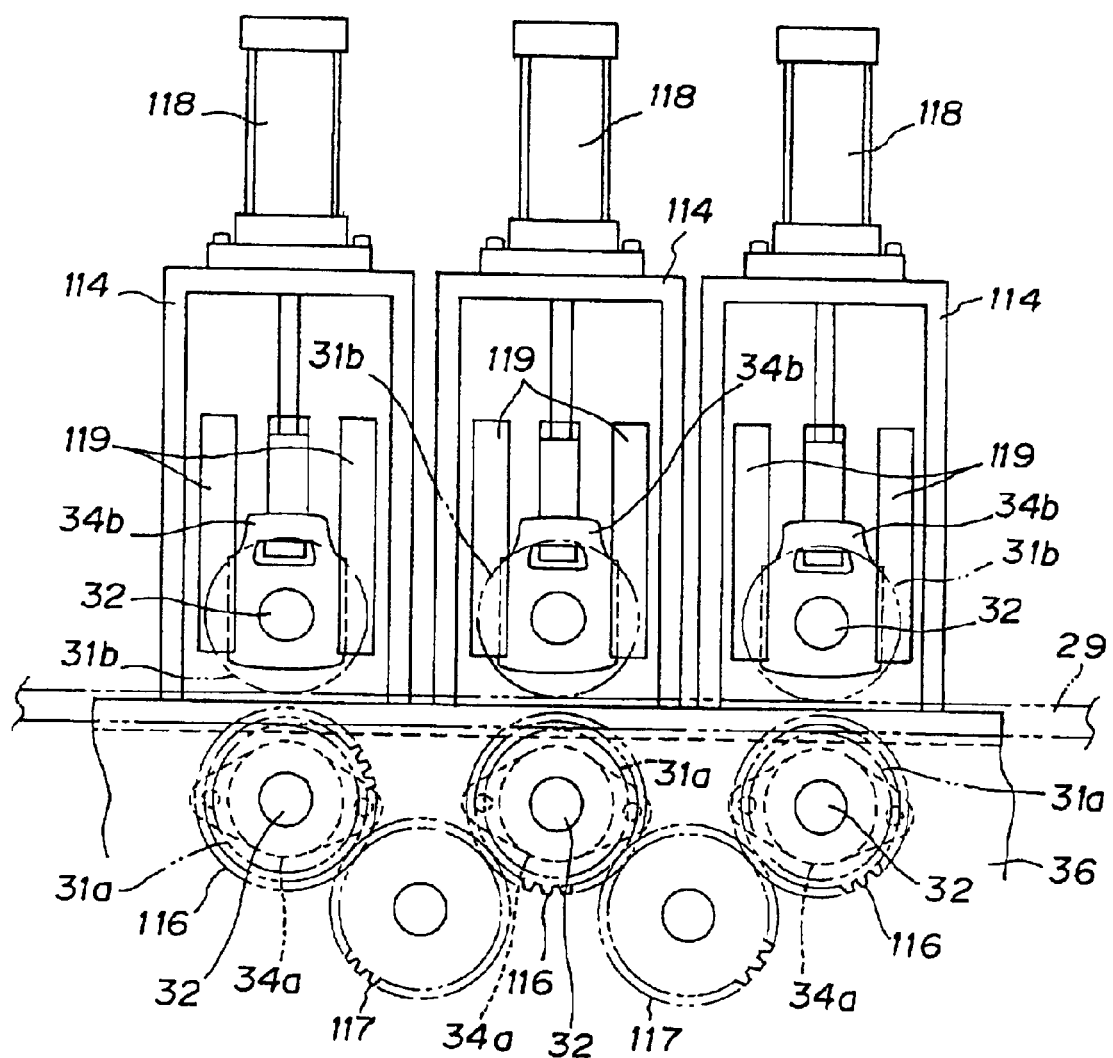
FIG. 15 is a longitudinal sectional view taken on line N—N of FIG. 14.
Figure 16:
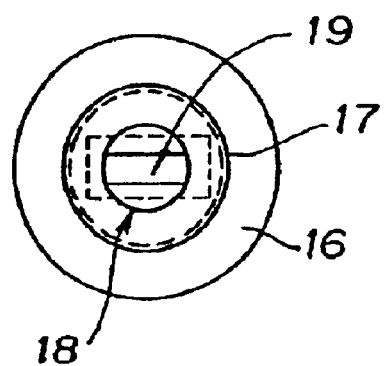
FIG. 16 is a longitudinal sectional view taken on line J—J of FIG. 8.

In FIG. 14 and FIG. 15, bearings 34a for supporting the two ends of the shafts of three free pinch rollers 31b, are respectively fixed to a bearing fixation frame 36, fixed pinch rollers 31a are driven by the gears 116 installed on each shaft, and gears 177 engaging with these gears 116. On the shaft of one fixed pinch roller 31a among the three fixed pinch rollers 31a, an input shaft of a powder break 115 is connected. The powder break is a so called electromagnetic break, and allows fine electrical adjustment of friction torque.

In addition, frames 114 are installed on the bearing fixation frame 36. Two block shaped guide members 119 with guiding grooves are respectively installed on the surface of the wall of this frame 114, with the direction of the axial line of the guide member 119 oriented approximately parallel to the up and down directions. Bearings 34b for supporting the two ends of the shafts of each of the three free pinch rollers 31b are installed to move freely upwardly and downwardly along the guiding grooves of the previously mentioned guide member 119, and the previously mentioned bearings 34b are respectively connected to the front ends of rods of three air cylinders 118 installed on the upper surface of the frames 114.

Therefore, under the operation of the cylinders 118, the three free pinch rollers 31b are respectively pressed against the fixed pinch rollers through a hollow resin molded board 29. The rotation of the shaft of one fixed pinch roller 31a among the three fixed pinch rollers 31a is restricted by the powder break 115, and since the gear 116 installed on the shaft of this fixed pinch roller 31a is engaged with the gears 116 and 116 installed on the shafts of the other two fixed pinch rollers 31a and 31b, through the shafts 117 and 117, the same rotation restriction force is applied on the three fixed pinch rollers 31a by the friction torque of the powder break 115.

In relation to the above, the friction torque for restricting the rotation of the fixed pinch roller 31a by the powder break 115 is adjusted by the thickness of the hollow resin molded board 29 to be formed.

Consequently, the friction torque of the powder break 115, is a restriction force against the force pushing out the hollow resin molded board 29, such that the extruded materials 79 inside the lead in portion 11 of the molding die 10 are in a more uniform and more dense state. These uniform and dense extruded materials 79 are pushed out by the force of the extruded materials 79 generated by the extruder 70, proceed while resisting against the restriction force of the previously mentioned coarsely crushing means 30, and are then cooled inside the molding chamber 22 and form the hollow resin molded board 29. This hollow resin molded board 29 proceeds by resisting against the restriction force of the powder break 115, rotating the previously mentioned fixed pinch rollers 31a and the free pinch rollers 31b.

The previously mentioned restriction force provides the extruded materials 79 both inside the molding chamber 22 and inside the lead-in portion 11, through the hollow resin molded board 29, with a resistance against the force applied by the extruder, which pushes out the extruded materials 79 inside the molding chamber 22, and the entire extruded materials 79 inside the molding chamber 22 become more uniform and of higher density. By applying a restriction force to the hollow resin molded board 29, the density of the extruded materials 79 increases, and therefore, the formation of air bubbles, foci and the likes is prevented. Consequently, a more uniform more dense and more lightweight hollow resin molded board is formed.

The sheathing board for use in a concrete form molded in the above described way, may be used as a sheathing board, after eliminating the skin layer of the surface by, for example, a sanding treatment of its surface, or without performing such processing, i.e. in the same state as when it was molded.

A sheathing board made of resin to replace a sheathing board made of plywood could be obtained, wherein the sheathing board of the present invention was obtained as described above, having characteristics that are extremely close to those of natural wood. In addition, with the formation of hollow spaces, its relative density is approximately as lightweight as a sheathing board made of plywood, and processing, such as cutting and drilling with manual tools, is relatively easy.

(Formation of Form (Mold))

The sheathing board 1 formed as described above, along with flaps 51 and 52 or support columns, or other supporting materials, is combined with a separator 61 for opening a defined interval between the sheathing boards 1, and a form tightener 62, for tightening the sheathing boards to prevent them from opening more than the specified spacing under the lateral pressure generated by the concrete, to form a concrete form 50.

Figure 18:
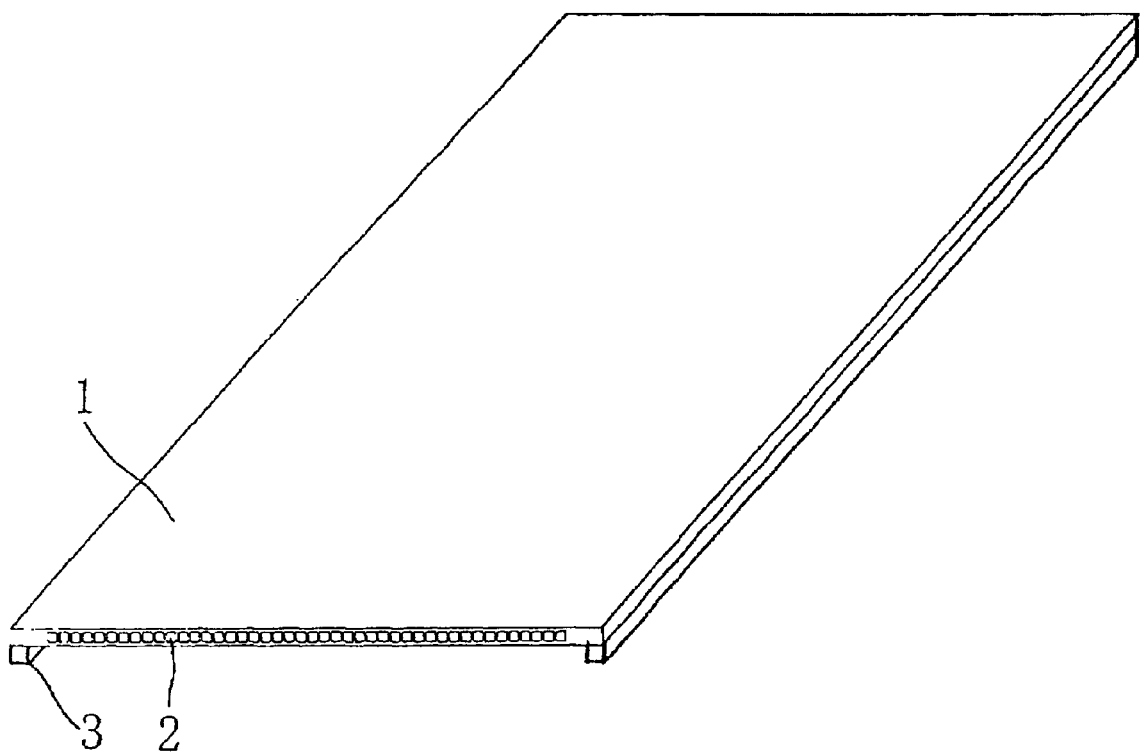
FIG. 18 is a perspective view of a sheathing board of the present invention to which shallow wood spacers have been mounted.

As shown in FIG. 18, spacers 3 and 3 are mounted on the surface of one side, for example, at the opposite two edges of the sheathing board 1 of the present invention. The mounting of spacers 3 and 3 allows the formation of specific concrete assemblies. For example, by opposing the two sheathing boards 1 and 1 through the faces which are opposite to the side where the spacers 3 and 3 are mounted, concrete is cast between these boards 1 and 1, and a concrete wall having the thickness corresponding to this interval between the sheathing boards 1 and 1 is formed.

Figure 19:
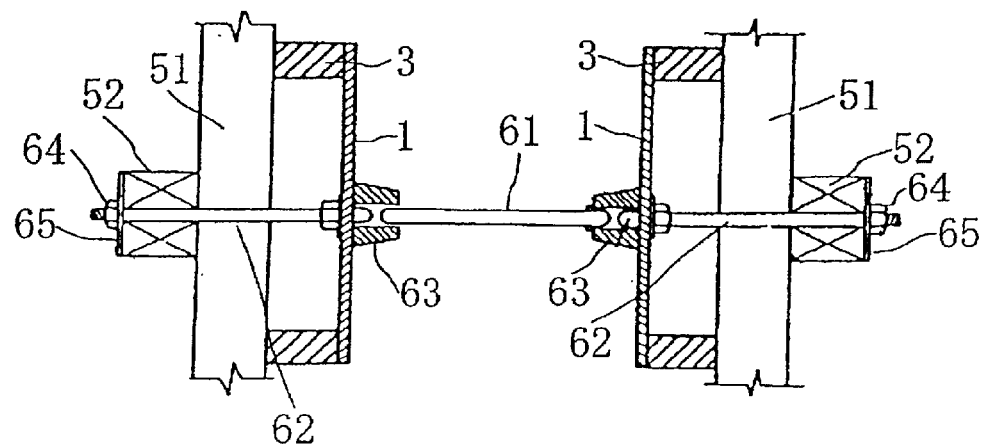
FIG. 19 is a partly sectional view of a concrete form showing an example of mounting the sheathing board.

As shown in FIG. 19, a separator 61 serving as a connecting rod which connects between the sheathing boards 1 and 1, and stoppers 63 and 63 such as standard washers, wood-concrete or plastic cones mounted on the two ends of the previously mentioned separator 61, for controlling the interval between the sheathing boards 1 and 1, and maintaining the interval of the spacing between the sheathing boards 61, prevent the interval of the space between the sheathing boards 1 and 1 from narrowing, and at the same time, by means of the form tight eners 62 and 62, connected to one end of the previously mentioned stoppers 63 and 63, and piercing and protruding from the sheathing boards 1 and 1, nuts 64 and 64, which screw into the threads formed at the other end of the previously mentioned tighteners 62 and 62, and the washers 65 and 65 and the like, which are pressed in the direction of the sheathing boards 1 and 1 by the tightening of the previously mentioned nuts 64 and 64, it is possible to press in the direction of the sheathing boards 1 and 1 and stabilize the vertical flaps 51 and 51, as well as the horizontal flaps 52 and 52, positioned along the sheathing boards 1 and 1, and to prevent the deformation of the concrete form 50.

The previously mentioned separator 61 is installed in the space maintained between the sheathing boards 1 and 1, and is used as a connecting rod connecting the sheathing board 1 and 1. Also, at the periphery of both ends, a male thread is formed at both ends of the separators 51 and 51 stoppers 63 and 63 such as washers, wood-concrete or plastic cones are mounted and the stoppers 63 and 63 strike the surface of the inner wall of the sheathing boards 1 and 1 to prevent the interval between the sheathing boards 1 and 1 narrowing. As one example, in the present embodiment standard plastic cones are used as these stoppers 63 and 63.

The plastic cones us ed as the stoppers 63 and 63 consist of a flat topped co ne shaped body wherein a nut or the like is buried and a screw hole is formed which pierces the center, the end portion of the previously mentioned separator is screwed and inserted from the end at the small diameter side up to the approximate center of this plastic cone, and the previously mentioned plastic cones are fixed at both ends of the separator.

The form tighteners 62 and 62 are mounted on the other end of the plastic cones which are screwed on both ends of the separator in the above described way.

These form tighteners 62 and 62 are formed from iron poles having the same diameter as that of the previously mentioned separators 61 and 61, a nd similarly to the previously mentioned separators, male screw threads are formed at the peripheries of their two ends, and they are stabilized by screwing and inserting one end into the screw hole which pierces the center of the plastic cones from the end on the larger diameter side.

Then, the other ends of the previously mentioned form tightener 62 and 62, while running through the washers 65 and 65, screw into the nuts 64 and 64. With the tightening of these nuts 64 and 64, the horizontal flaps 52 and 52 abutting against the washers 65 and 65 are pressed in the direction of the sheathing boards 1 and 1. Thus, the sheathing boards 1 and 1 are fixed by the vertical flaps 51 and 51, and the horizontal flaps 52 and 52 to form the concrete form 50.

Figure 20:
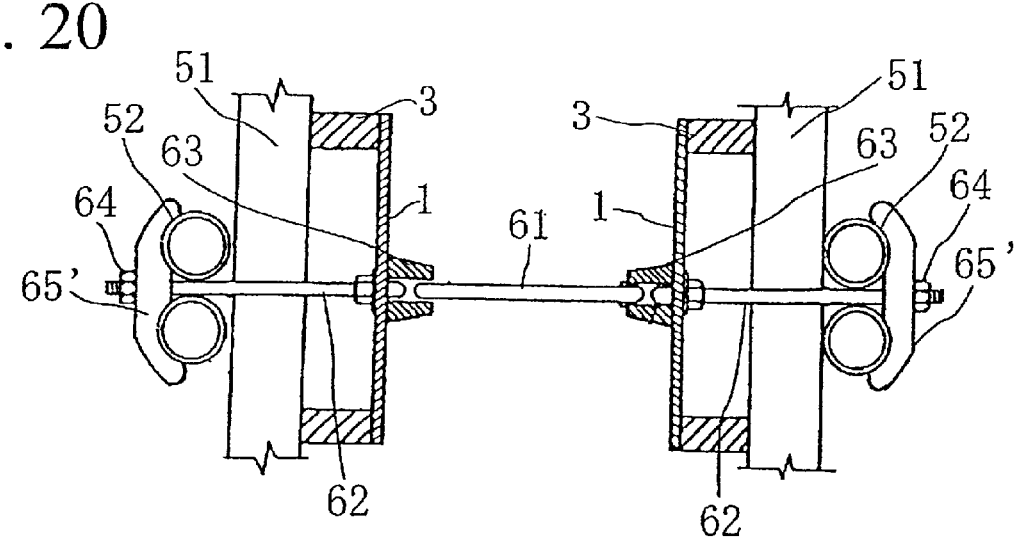
FIG. 20 is a partly sectional view of a concrete form showing an example of variation of FIG. 19.

In addition, the construction may be such that, as an alternative to the washers through which the previously mentioned form tighteners run, as shown in FIG. 20, cured washers 65' and 65' are mounted, and iron pipes are used as the horizontal flaps 52 and 52, fixed by the curved surface of these curved washers 65' and 65'.

Figure 21:
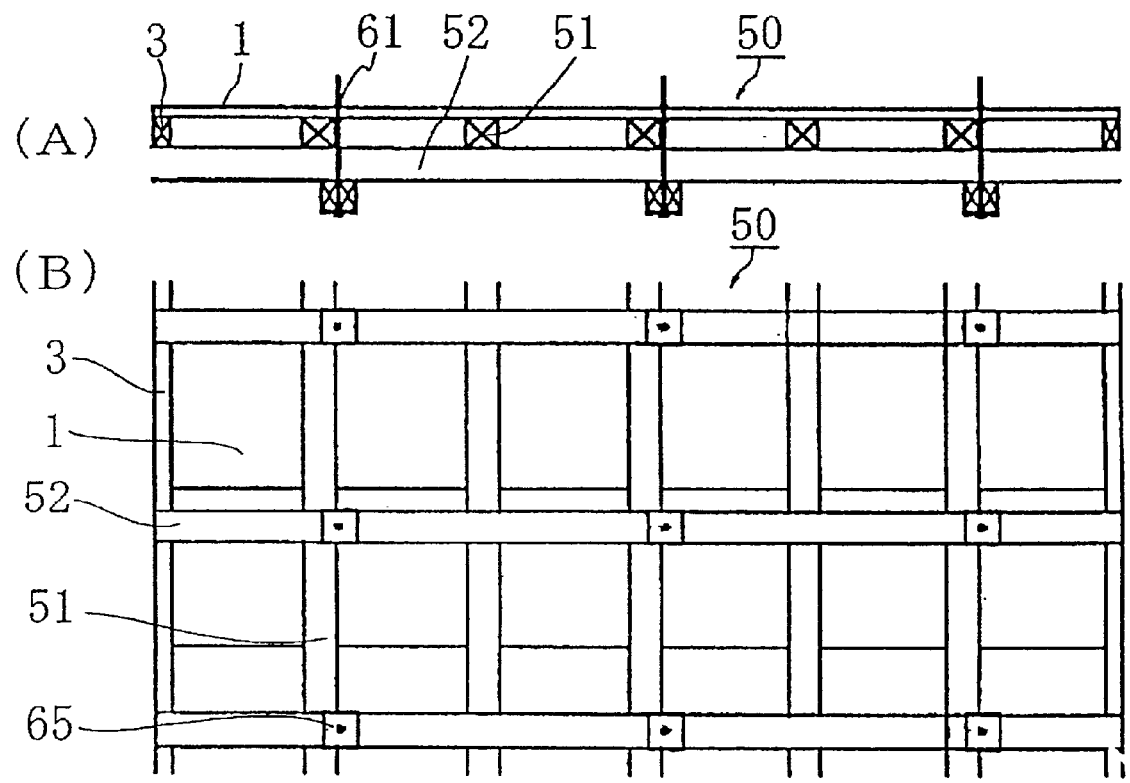
FIG. 21 is an illustration showing an example of assembly using the sheathing board of the present invention concrete form, with (A) being a plan view and (B) being a front view.

In the embodiment shown in FIG. 21(A) and FIG. 21(B), the spacers 3 and 3 are mounted along the two edges constituting the short edges of the sheathing board 1 formed to have a width of 600 mm, and a length of 1,800 mm, and at the same time as aligning several layers of this sheathing board 1, the horizontal flap 52 is positioned with an interval of approximately 750 mm, the vertical flap 51 is positioned with an interval of approximately 300 mm, and the previously mentioned separator 61 is installed with an interval in the vertical direction of approximately 750 mm, and with an interval in the horizontal direction of approximately 600 mm.

Figure 22:
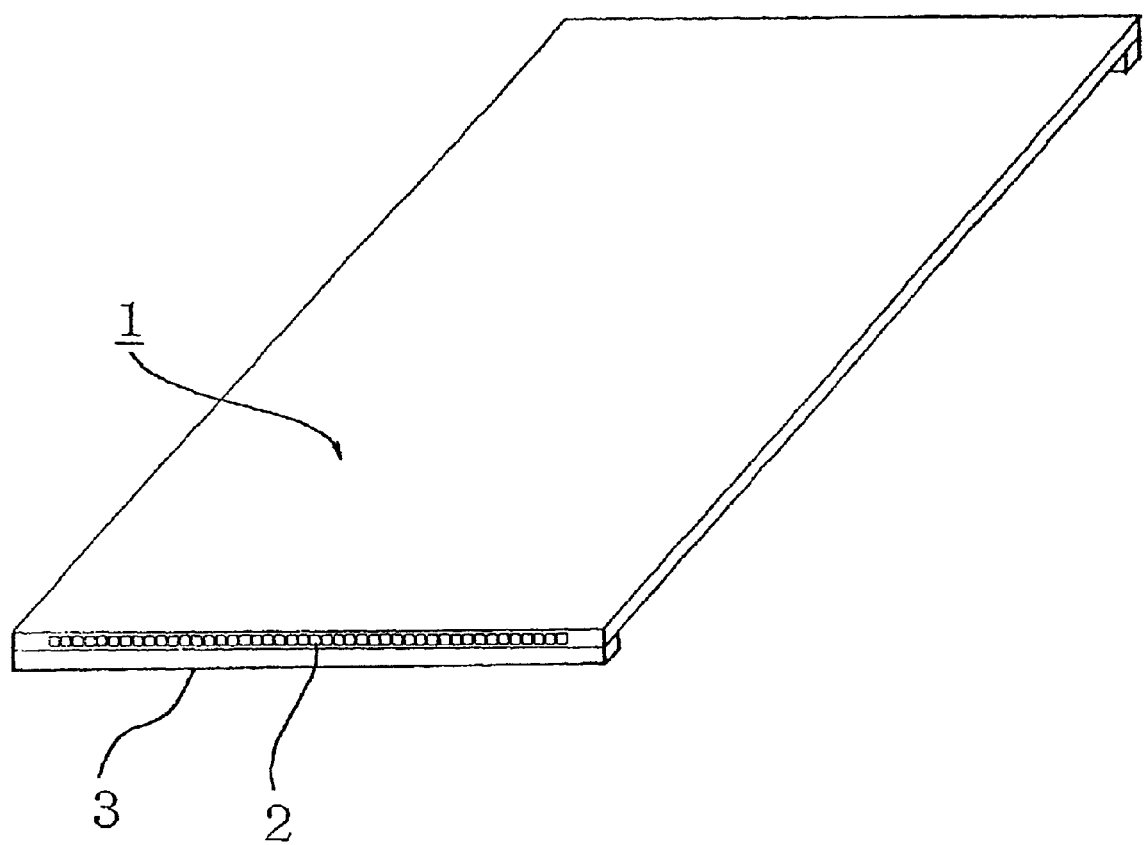
FIG. 22 is a perspective view of a sheathing board of the present invention to which shallow wood spacers have been mounted.
Figure 23:
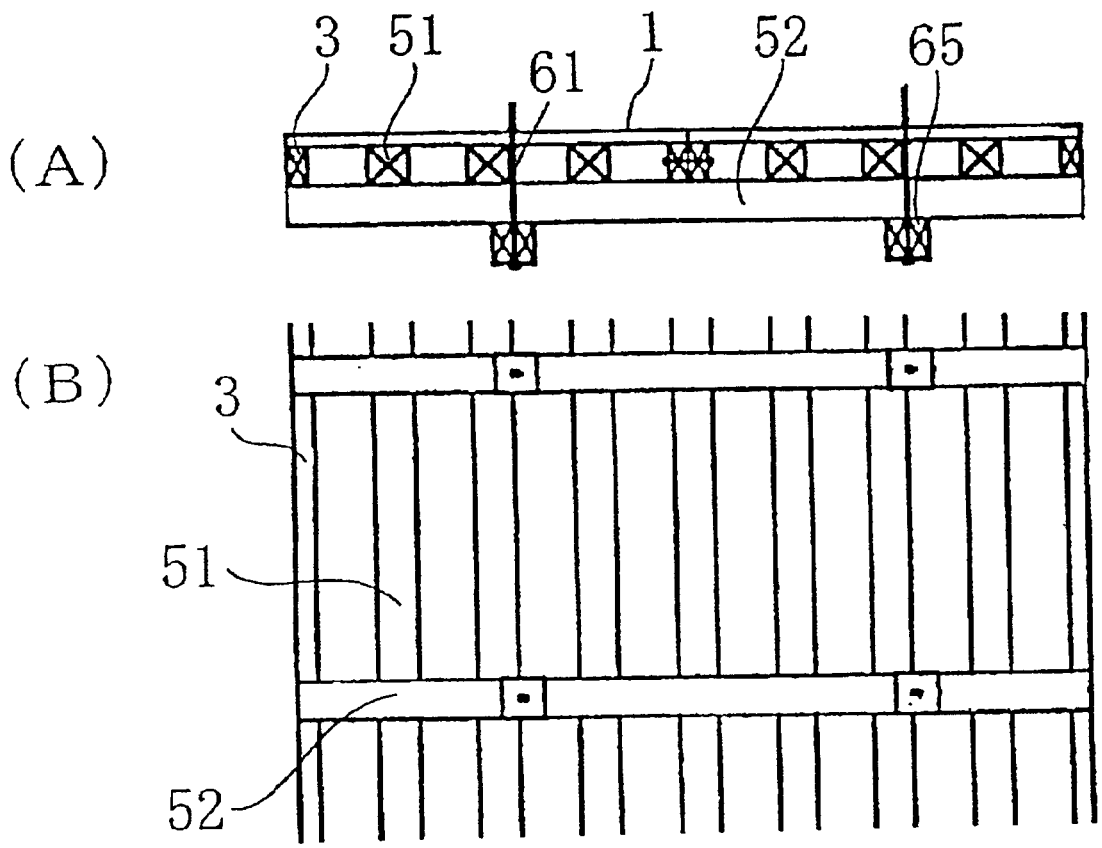
FIG. 23 is an illustration showing another example of assembling the concrete form using the sheathing board of the present invention, with (A) being a plan view and (B) being a front view.

In addition, the sheathing board 1 of the present invention may be positioned by taking the direction of the length as the direction of the height, as shown in FIG. 23(A) and FIG. 23(B), by mounting the spacers 3 and 3 along the two edges constituting the direction of the length of the sheathing board, as shown in FIG. 22.

(Embodiment)

In the following, the embodiment of the present invention will be explained.

(1) Example of Fabrication of the Sheathing Board

A sheathing board of the present invention was fabricated under the conditions indicated below (in the table, immaculate means example of immaculate sheathing board).

TABLE 1 example of fabrication of sheathing board

| extruder | diameter: 115 mm | single shaft extruder |
|---|---|---|
| clearance | 0.2 mm (space between the screw71 and the barrel 74) | |
| molding die 10 | width: 730 mm Height: 420 mm (vertical section in the direction of the width) | |
| length of the molding die | 1,000 mm (from the inlet of the molding chamber to the die outlet) | |
| delivery amount | hollow<br>115 kg/h | immaculate<br>198 kg/h |
| particle diameter of raw materials | mean particle diameter less than 120 mesh | |
| combination | thermoplastic resin<br>wood meal | PP 45 wt %<br>actual relative amount 0.9<br>55 wt %<br>water content 0.1 wt %<br>actual relative amount 1.2~1.4 |
| production capacity | hollow<br>approx. 15 m/h | immaculate<br>approx. 25 m/h |

Under the above conditions, a sheathing board for use in a concrete form was formed, by cutting a hollow board formed by extrusion, having a width of 600 mm, a thickness of 18 mm and a hollowness of 38.9% to a length of 1,800 mm.

This sheathing board has 42 hollow spaces formed, having a rectangular cross section of 10 mm×10 mm formed in the direction of the length of the sheathing board, in a width of 600 mm with an interval of 3 mm, and its weight is approximately 13.3 kg.

In the case of an immaculate sheathing board, the width is 12 mm, and the weight is approximately 14.3 kg.

In addition, the calculation of the weight in the case of the hollow sheathing board, is as shown below.

In the event that a sheathing board having the same size is fabricated with only PP as raw materials, by taking approximately 0.9 as the relative density of PP (ρ), the weight is 60×1.8×180×0.9=17.9 (kg), and the sheathing board of the present invention is extremely lightweight, when compared to a sheathing board fabricated from only PP as raw materials;

in addition, when fabricating a sheathing board having the same size from plywood, by taking 0.45 to 0.75 as the general relative density of plywood (ρ), the weight is 60×1.8×180×(0.45~0.75)=8.7~14.6 (kg), and a lightweight sheathing board was obtained which compares favorably with a sheathing board made of plywood.

(2) Bending Strength Test

The bending strength of the sheathing board of the present invention, was evaluated under the conditions described below.

In addition, the sheathing board used as testing materials, with the exception of the length, are identical to those fabricated in the previously mentioned example of fabrication.

test method: bissectional three point flexural test test shape conditions: 600 W×1000 L×18 T (immaculate: 12 T)

span: 900 mm test speed: 5 mm/min test room temperature: 20° C.

test room humidity: 60%

Under the above conditions, the results on the measurements of the bending strength of sheathing board of the present invention, are shown in Table 2. As it is clear from the Table 2, the sheathing board of the present invention, has a bending strength of approximately twice the standard value in the "concrete standards specifications (application)" established in Hei 8 (1998), and has an adequate strength to be employed as a sheathing board for use in concrete form.

TABLE 2 bending strength test form of the present application

| item | units | hollow | immaculate | standards✕ |
|---|---|---|---|---|
| bending strength | kgf/cm² | 328 | 320 | 165 |

✕"concrete standards specifications (application)" established in Hei 8.(1998) (Japan Society of Civil Engineers)

(Mold Release Test)

The sheathing board of the present invention (without a mold release agent coat), and a sheathing board made of plywood coated with a mold release agent, which were respectively not reused or reused three times were used to perform casting of concrete, the state of the surface of the sheathing board after mold release was visualized and inspected. The results are shown in Table 3.

As is clear from Table 3, the sheathing board of the present invention has an excellent mold releasing property even after repeated use, and it is shown that the board can endure repeated use, and has a long lifespan.

TABLE 3 mold release test

| | sheathing board of the present application | | sheathing board made of synthetic wood | |
|---|---|---|---|---|
| item | non reused | reused three times | non reused | reused three times |
| state of the surface | ○ | ○ | ○ | Δ |

○: incrustation of concrete is extremely low and does not require surface cleaning operations.
Δ: concrete is incrusted and requires surface cleaning operations. (bending strength test on regenerated sheathing board)

A non regenerated sheathing board of the present invention, and a regenerated sheathing board obtained by regenerating an already used sheathing board by the method of the present invention, were taken as the processing object of the bending strength test. The results of the tests performed on both sheathing boards are shown in the table 4. In addition, the testing conditions were identical to the previously described the bending test with non regenerated sheathing board (Table 2). In the table, the sustain rate is expressed by the following equation:

sustain rate (%)=bending elasticity of the regenerated sheathing board/bending elasticity of the regenerated sheathing board)×100.

As shown in Table 4, when compared to the non regenerated sheathing board, the bending strength (sustain rate) of the sheathing board regenerated by the method of the present invention decreases by only approximately 2% and this decrease is almost unnoticeable, showing clearly that it has an adequate bending strength to be employed as a regenerated sheathing board for use in concrete form.

TABLE 4 comparative tests on the bending strength between the regenerated sheathing board and the non regenerated sheathing board.
(application test example)

| | | non regenerated article | | regenerated article | |
|---|---|---|---|---|---|
| item | unit | hollow | immaculate | hollow | immaculate |
| bending strength | kgf/cm² | 328 | 320 | 321 | 314 |
| sustain rate | % | | 100 | | 98 |

Using sheathing boards of the present invention (non regenerated article and regenerated article) a concrete mold was assembled, and concrete was cast inside this form, to fabricate a concrete wall having a height of 7405 mm, a width of 9500 mm and a width of 1500 mm. In addition, the conditions for assembling the form are as shown in Table 5.

TABLE 5

| application conditions | |
| --- | --- |
| No. of sheathing board used | approx. 65 |
| interval between horizontal flaps | 750 mm |
| interval between vertical flaps | 300 mm |
| interval between separators | 1370 mm |

The concrete form assembled with the above conditions, did not display bowing, deformation, breakage or the like, due to the casting of concrete, and clearly shows that the sheathing board of the present invention has adequate strength to be employed as a sheathing board for use in concrete form.

In addition, the surface after mold release of the concrete wall is even, moreover, at when released from the mold, incrustation of concrete on the surface of the sheathing board was hardly visible, clearly showing that the board has excellent characteristics as a sheathing board.

With the construction of the present invention explained above, through a relatively simple method, without performing an operation to eliminate incrusted concrete and at a low cost, at the same time as recycling synthetic wood materials turned into materials from an already used sheathing board for use in concrete form having synthetic wood materials as raw materials, using this recycled resin materials and the like as raw materials, for example, by refabricating a concrete form, the use of regenerated sheathing board made of resin is promoted, at the same time as, a sheathing board made of low cost synthetic wood materials is provided, and the use of non recyclable form made of plywood is reduced and allows an effective utilization of resources.

In addition, through the method of the present invention, the sheathing board for use in concrete form fabricated with recycled synthetic wood materials as raw materials, is as lightweight as a sheathing board made of plywood, its workability is adequate and the handling is convenient, and at the same time, it has an adequate strength for use in concrete form, in addition, a form could be provided made of resin which can be regenerated after use by retransforming into materials. Therefore, in this way, the usage of sheathing boards made of plywood having natural wood as raw materials is reduced and an effective usage of the resources and the improvement of the natural environment can be achieved.

Now, that the invention has been described. Thus, the broadest claims that follow are not directed to a machine that is configure in a specific way. Instead, said broadest claims are intended to protect the heart or essence of this breakthrough invention.

This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

EXPLANATION OF NUMERALS

1 sheathing board used as concrete form
81 particles of sheathing board (after coarsely crushing step)
82 coated particles
83 granulated synthetic wood meal material
84 dust
100 sieve
102 dryer
110 crusher (coarsely crushing means)
120 cutter mill (fine crushing means)
121 cutter mill main body
123 charging port
124 cutter supporter
125 rotating knives
126 fixed knives
127 charging chamber
128 crushing chamber
129 screen
130 cleaning separator (means for the separation, classification and size regulation)
131 fixed disk
132 supply charging port
133 fixed end plate
134 fixed pin
135 peripheral plate
141 mobile disk
142 horizontal rotation shaft
143 bearing
144 mobile pin
151 screen
152 discharge port
153 collection port
155 processing space
156 discharge space
157 blower
158 blower
161 motor
231 supply pipe
235 communicating pipe
236 piping
237 branch pipe
238 three way electromagnetic valve
239 discharge pipe
240 recovery tank
250 collection tank

What is claimed is:

1. A sheathing board for use in a concrete form having recycled synthetic wood material as raw materials, wherein synthetic wood materials recycled from a sheathing board made from synthetic wood materials which was already used as concrete form is used as raw materials, the synthetic wood materials has a moisture content of less than 15 wt %, and is a mixture of between 20 and 75 wt % of cellulose crushed materials, and between 25 and 80 wt % of thermoplastic resin molding materials, numerous hollow chambers are formed inside its thickness, extended in a defined direction, at a defined interval, forming a hollowness of between 20 and 70%, and the thickness of the walls delimiting the previously mentioned hollow chambers is greater than 2 mm.

* * * * *